(12) United States Patent
Beck et al.

(10) Patent No.: US 11,199,208 B2
(45) Date of Patent: Dec. 14, 2021

(54) DOWEL FOR ARRANGING IN LIGHTWEIGHT BUILDING BOARDS, METHOD FOR FIXING AT LEAST ONE DOWEL AND ARRANGEMENT COMPRISING A DOWEL AND A LIGHTWEIGHT BUILDING BOARD

(71) Applicant: Würth International AG, Chur (CH)

(72) Inventors: Daniel Beck, Wiesloch (DE); Thorsten Schulze Niehues, Künzelsau (DE)

(73) Assignee: WÜRTH INTERNATIONAL AG

(*) Notice: Subject to any disclaimer, the term of this patent is extended or adjusted under 35 U.S.C. 154(b) by 218 days.

(21) Appl. No.: 16/684,137

(22) Filed: Nov. 14, 2019

(65) Prior Publication Data
US 2020/0158149 A1    May 21, 2020

(30) Foreign Application Priority Data
Nov. 15, 2018    (DE) .................... 10 2018 219 512.9

(51) Int. Cl.
F16B 5/00        (2006.01)
B32B 3/00        (2006.01)
(Continued)

(52) U.S. Cl.
CPC ................. F16B 5/01 (2013.01); B32B 3/12 (2013.01); B29C 65/08 (2013.01); B29C 66/474 (2013.01); B29C 66/72525 (2013.01); B29C 66/8322 (2013.01); B29K 2311/14 (2013.01); B29L 2031/608 (2013.01); B29L 2031/737 (2013.01);
(Continued)

(58) Field of Classification Search
CPC ..... F16B 5/00; F16B 5/01; B32B 3/00; B32B 3/10; B32B 3/12
See application file for complete search history.

(56) References Cited

U.S. PATENT DOCUMENTS

| 3,651,563 | A | * | 3/1972 | Volkmann | ............. | F16B 37/067 |
| | | | | | | 29/523 |
| 7,950,129 | B2 | * | 5/2011 | Clinch | .................. | B29C 66/114 |
| | | | | | | 29/525.01 |
| 2015/0174818 | A1 | * | 6/2015 | Mayer | ................... | B29C 66/723 |
| | | | | | | 156/73.1 |

FOREIGN PATENT DOCUMENTS

EP    2202050    6/2010
EP    3228879    10/2017

OTHER PUBLICATIONS

European Search Report for EP App. 19209034.8 dated Apr. 15, 2020; 5 pages.

* cited by examiner

*Primary Examiner* — Jacob T Minskey
*Assistant Examiner* — Matthew Hoover
(74) *Attorney, Agent, or Firm* — Boyle Fredrickson, S.C.

(57) ABSTRACT

The invention relates to a dowel for arranging in lightweight building boards, wherein a lightweight building board has a first cover layer and a second cover layer made of compact, pressure-resistant material and, arranged between the cover layers, a core layer made of material having a lower density than the cover layers, comprising a first dowel part and a second dowel part, wherein the first and the second dowel part are designed to be displaceable relative to one another, in which dowel the first dowel part and the second dowel part each have at least two fingers which extend parallel to a longitudinal direction of the dowel, wherein, in the plugged-together state of the first and second dowel part, the fingers of the first dowel part and the fingers of the second dowel part inter-engage at least in certain portions.

26 Claims, 13 Drawing Sheets

(51) Int. Cl.
   F16B 5/01     (2006.01)
   B32B 3/12     (2006.01)
   B29C 65/08       (2006.01)
   B29C 65/00       (2006.01)
   B29K 311/14      (2006.01)
   B29L 31/60       (2006.01)
   B29L 31/00       (2006.01)
   F16B 13/14       (2006.01)
(52) U.S. Cl.
   CPC ..... *B32B 2250/40* (2013.01); *B32B 2307/718* (2013.01); *F16B 13/141* (2013.01)

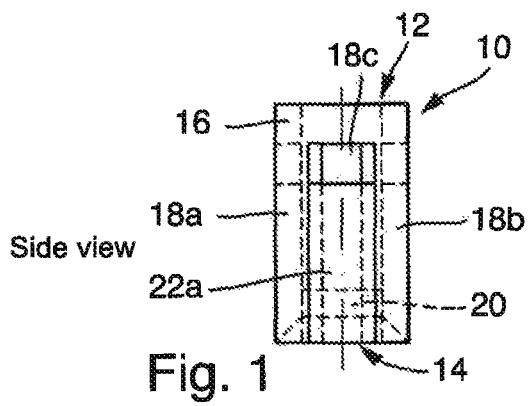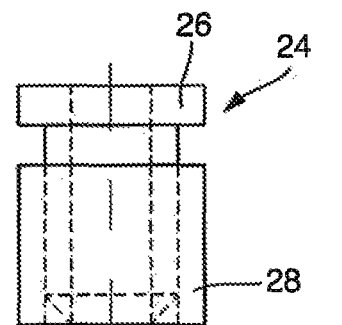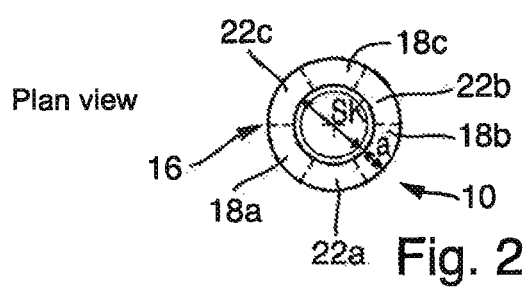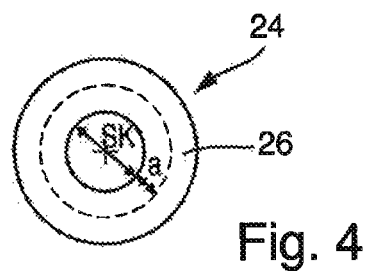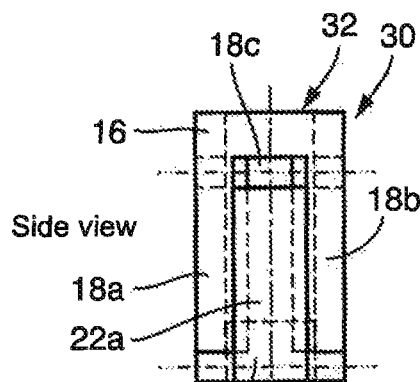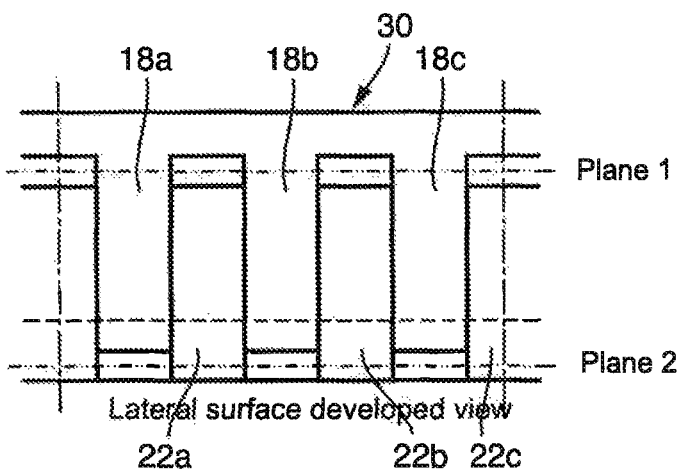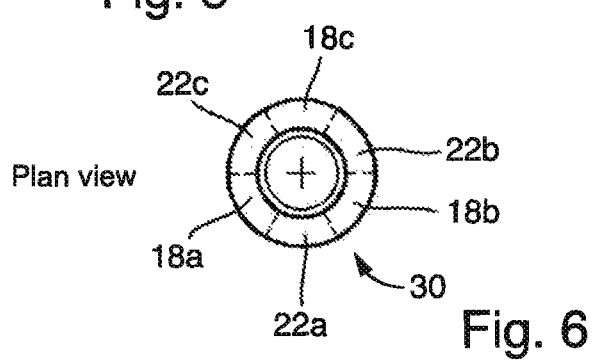

Plan view

View from below

Part A

Part B

1. Introduce blind hole bore

2. Insert adapter

3. Introduce adapter/anchor by means of ultrasound application

1a. Introduce blind hole bore

1b. Introduce blind hole bore

1c. Introduce blind hole bore

2. Insert adapter

3. Introduce adapter/anchor by means of ultrasound application

DOWEL FOR ARRANGING IN LIGHTWEIGHT BUILDING BOARDS, METHOD FOR FIXING AT LEAST ONE DOWEL AND ARRANGEMENT COMPRISING A DOWEL AND A LIGHTWEIGHT BUILDING BOARD

FIELD OF THE APPLICATION

The invention relates to a dowel for arranging in lightweight building boards, wherein a lightweight building board has a first cover layer and a second cover layer made of compact pressure-resistant material and, arranged between the cover layers, a core layer made of material having a lower density than the cover layers, in particular paper honeycombs, foam or solid wood of low density, e.g. balsa wood comprising a first dowel part and a second dowel part, wherein the first and the second dowel part are designed to be displaceable relative to one another. The invention also relates to a method for fixing a dowel according to the invention and to an arrangement comprising a dowel according to the invention and a lightweight building board.

BACKGROUND

Lightweight building boards have a first cover layer and a second cover layer made of compact, pressure-resistant material and, arranged between the cover layers, a core layer made of material having a lower density than the cover layers. The core can consist, for example, of paper honeycombs or else of foam. The fastening of dowels in lightweight building boards is problematic on account of the thin cover layers and the low density and low strength of the core layer. The core layer materials used in lightweight building boards can be, apart from paper honeycombs and synthetic foams, also other foams, for example wood foams, or lightweight solid woods, such as, for example, balsa wood, having an increased strength. If such core layer materials having an increased strength are pressed with thin, pressure- and/or temperature-sensitive and/or non-porous cover layer materials to form a sandwich, it is advantageously possible to dispense with a connection of the dowel to the cover layers, in particular to the cover layer situated opposite to the introduction direction, and only a connection can be made to the core layer material and/or a boundary layer between core layers and cover layers. Precisely in the case of thin, pressure-sensitive, temperature-sensitive and/or non-porous cover layer materials, the introduction of a dowel, which is fixed by means of introducing ultrasonic energy, can then be accomplished more easily and especially in a process-reliable manner, since less attention has to be paid to the sensitive cover layers.

SUMMARY

A dowel for arranging in lightweight building boards, a method for fixing at least one dowel in a lightweight building board and an arrangement comprising a dowel and a lightweight building board are intended to be improved by the invention to the effect that a flexible use in lightweight building boards consisting of different materials of cover layers and core layers is possible without problems.

According to the invention, there is provided for this purpose a dowel having the features of Claim 1, a method having the features of Claim 23 and an arrangement having the features of Claim 25. Advantageous developments of the invention are specified in the dependent claims.

The dowel according to the invention is provided for arranging in lightweight building boards, wherein a lightweight building board has a first cover layer and a second cover layer made of compact, pressure-resistant material and, arranged between the cover layers, a core layer made of material having a lower density than the cover layers, in particular paper honeycomb, foam or lightweight solid wood, for example balsa wood. The dowel has a first dowel part and a second dowel part, wherein the first and the second dowel part are designed to be displaceable relative to one another. The first dowel part and the second dowel part each have at least two fingers which extend parallel to a longitudinal direction of the dowel. The provision of fingers which extend parallel to a longitudinal direction of the dowel creates the possibility that the dowel according to the invention can also be anchored in the lightweight building board and in particular in the core layer of the lightweight building board at the contact points between the fingers of the first dowel part and the fingers of the second dowel part, at the contact points between the fingers of the first dowel part and the second dowel part, between the fingers of the second dowel part and the first dowel part and/or between the first dowel part and the second dowel part. The configuration of the dowel with a plurality of fingers which extend parallel to a longitudinal direction of the dowel, wherein the fingers of the first dowel part and the fingers of the second dowel part are displaceable relative to one another, allows a flexible arrangement and fastening of the dowel in a lightweight building board. Here, by virtue of the provision of in each case at least two fingers on the first dowel part and on the second dowel part, the relative displaceability of the first dowel part and of the second dowel part does not come at the cost of increased wall thickness of the dowel. This is because the fingers of the first dowel part or of the second dowel part can each be arranged in a grid-like manner, with the result that the fingers inter-engage when joining together the first dowel part and the second dowel part. The fingers of the first dowel part and of the second dowel part are thus situated next to one another in the circumferential direction of the dowel and not behind one another in the radial direction. As a result, the dowel according to the invention can be designed to be very compact with a small wall thickness without compromises having to be made in the mechanical strength of the dowel. The fingers on the first dowel part and on the second dowel part allow not only a fixing in the core layer but also a fixing by means of an undercut on the two cover layers. This is particularly advantageous when the cover layers are very thin but have a comparatively high density and strength. In the pushed-together state, the fingers on the first dowel part and the fingers on the second dowel part inter-engage at least in certain portions, with the result that the first dowel part and the second dowel part thus form a hollow-cylinder-like structure, wherein the wall of this hollow-cylinder-like structure, as seen over the circumference, is formed in certain portions by fingers of the first dowel part or with fingers of the second dowel part.

In a development of the invention, in the mounted state of the dowel, the dowel parts form a cylindrical, in particular circular-cylindrical, body.

In a development of the invention, in the mounted state of the dowel, the fingers of the two dowel parts form wall portions of a cross-sectionally ring-shaped, in particular circular-ring-shaped, body.

Since the wall of the dowel is thus formed at least in certain portions by fingers of the first dowel part or fingers of the second dowel part, the dowel according to the invention can be designed to be very compact with a small wall thickness.

In a development of the invention, the fingers form, as seen in cross section, polygonal segments, in particular of a ring-shaped body.

In a development of the invention, the fingers form, as seen in cross section, circular-ring segments.

The fingers thus supplement one another to form a circular-ring surface. Ultrasonic energy can thus also lead to a liquefaction of the thermoplastic material of the fingers on the surfaces of adjacent fingers which bear against one another. As a result, the fixing of the dowel can occur also in the core layer or by means of an undercut at the transition between the core layer and the first and/or second cover layer.

In a development of the invention, the body forms an outer wall having a generally triangular, rectangular, elliptical, oval, circular or in the form of the figure eight cross-sectional shape.

Depending on the intended application of the dowel according to the invention, a shape of the cross section of the dowel can be selected. Cross-sectional shapes are expediently selected in which appropriate blind holes can be introduced into lightweight building boards by means of rotating tools, for example milling cutters or drills.

In a development of the invention, the fingers at least partially have, at their free end, an end surface which is preferably arranged obliquely to the longitudinal direction of the dowel.

Such an end surface on the fingers that is arranged obliquely to the longitudinal direction of the dowel can be used for various purposes. On the one hand, ultrasonic energy introduced therethrough can be directed in such a way that rapid heating and thus softening or liquefaction of the thermoplastic material of the fingers occurs. An oblique end surface of the fingers can also be used to produce a spreading action of the fingers when sliding the first dowel part and the second dowel part into one another. Moreover, an oblique end surface of the fingers allows the region in which an integrally bonded and/or form-fitting fixing with the material of the lightweight building board occurs to be distributed over a somewhat greater height region of the lightweight building board.

With the provision of an oblique end surface of the fingers, the opposite stop surface on the respective other dowel part can be configured in a suitable manner in order, for example, to act as an energy flow director upon introduction of ultrasound, in order to cause a reliable connection between the fingers and the counter-surface upon introduction of ultrasonic energy and upon the subsequent cooling of the thermoplastic material and/or in order to cause radial spreading of the fingers upon abutment on the counter-surfaces. For example, in the case of oblique end surfaces of the fingers, it is also possible for the stop surfaces of the other dowel part to be configured obliquely, with the result that, upon pushing together the two dowel parts and upon abutment of the fingers on the opposite stop surfaces, the fingers are pressed outwardly in the radial direction. The end surfaces of the fingers can, for example, also have a roof-shaped or even conical design in order to act as energy flow directors upon introduction of ultrasonic energy. The end surfaces of the fingers or the opposite stop surfaces can, for example, also have recesses which are then formed to match the end surfaces or end configurations of the fingers in order to act as energy flow directors and in order to ensure reliable welding of the fingers and of the opposite stop surfaces upon introduction of ultrasonic energy and upon the subsequent cooling. In a development of the invention, the end surface runs obliquely towards the centre longitudinal axis of the dowel and/or the end surface extends in an ascending manner in a side view of the dowel.

According to the invention, there is thus provision that the end surface runs obliquely upwardly or obliquely downwardly towards the centre longitudinal axis of the dowel. The scope of the invention also covers tapering ends of the fingers in which two oblique end surfaces run towards an end edge. Moreover, the end surfaces can be arranged in such a way that, optionally in addition to an obliquely upwardly or downwardly tapering arrangement, they ascend or slope down in the circumferential direction.

In a development of the invention, the fingers are designed to taper in the longitudinal direction of the dowel, wherein the fingers of the first dowel part are designed to taper downwardly and the fingers of the second dowel part are designed to taper upwardly.

In a side view or in a developed view of the lateral surface of the dowel, there thus results a shape of the fingers which can be described as triangular or triangular with a cut-off tip. When pushing together the first dowel part and the second dowel part, the two dowel parts can thus be displaced towards one another only so far until the lateral surfaces of the respective triangular fingers bear against one another. A further pressing-together of the dowel parts can, given a corresponding configuration of the lateral surfaces, then lead to a possibly desired spreading in the central region of the dowel so as to achieve fixing in the core layer. However, the configuration of the lateral surfaces of the triangular fingers that bear against one another can also be designed in such a way that there occurs no spreading but, by means of introduced ultrasonic energy, rapid heating and possibly liquefaction of the thermoplastic material of the fingers in the region of the lateral surfaces which bear against one another.

In a development of the invention, the fingers at least partially have one or more steps in a lateral surface which bears against an adjacent finger, in particular in the longitudinal direction of the respective fingers.

Contact points of the fingers of the first dowel part and of the fingers of the second dowel part can thus be laid onto a plurality of planes. Here, these planes can be different both in the longitudinal direction of the dowel and in the radial direction of the dowel. Such stepped lateral surfaces and distribution of the contact surfaces of the fingers onto a plurality of planes allows particularly reliable fixing of the dowel in lightweight building boards to be achieved.

In a development of the invention, mutually opposite lateral surfaces of adjacent fingers bear against one another in the mounted state of the dowel.

The fingers thus jointly form a ring-shaped body. A stepped formation of the lateral surfaces in the longitudinal direction of the dowel can here ensure a defined end stop and thus a defined length of the dowel in the mounted state. Moreover, it is thereby possible to achieve heating and liquefaction of the thermoplastic material of the dowel in the region of the steps and thus fixing of the dowel at a desired point over the thickness of the lightweight building board.

In a development of the invention, the fingers have one or more steps in the lateral surfaces in a section plane perpendicular to the longitudinal axis.

When the lateral surfaces bear against one another, such a stepped formation in the radial direction of the dowel can ensure not only a closed ring-shaped cross section of the dowel wall, but a situation can also be prevented in which, when pushing together the first dowel part and the second dowel part, the fingers deflect in the radial direction, but rather are guided on one another in the longitudinal direction.

In a development of the invention, the two dowel parts and the fingers are designed in such a way that, in the mounted state of the dowel, the fingers are pressed radially outwardly at their free ends.

Here, the ends of the fingers and/or the basic body of the dowel part have oblique surfaces, with the result that, when pushing together the dowel parts towards one another, the free ends of the fingers are pressed outwardly.

This can produce a spreading action of the dowel, which ensures a more stable fixing either in the region of the cover layers or else in the region of the core layer. Such a spreading action can also achieve a situation in which the dowel undercuts the first cover layer and/or the second cover layer and is thus likewise fixed securely in the lightweight building board.

In a development of the invention, the two dowel parts form a screw channel in the mounted state of the dowel.

Here, the screw channel can be tailored to the intended application and be designed, for example, for screwing in a threaded bolt, a wood screw, another screw and the like.

In a development of the invention, at least one of the dowel parts has radially inwardly protruding projections to form the screw channel.

In this way, the screw channel can be formed by the projections of only one dowel part or else of both dowel parts. A suitable design of the projections, for example with a triangular cross section, allows a plurality of projections to supplement one another to form an approximately closed circumference of the screw channel if only small spacings are provided between the projections.

In a development of the invention, the projections are arranged on the inner side of the fingers.

In a development of the invention, each dowel part has a basic body to which the fingers of a respective dowel part are connected.

For example, the basic body is disc-like, in particular ring-shaped. The basic body also serves, in at least one dowel part, to introduce ultrasonic energy, and, for this purpose, an outer circumference of the basic body can, at least in one of the dowel parts, be provided for example with numerous small projections which orient the ultrasonic energy and ensure rapid heating or liquefaction of the thermoplastic material of the dowel.

In a development of the invention, a first end of the fingers is connected to the basic body and the fingers extend from the basic body as far as their free end.

In a development of the invention, the first dowel part and the second dowel part are identically designed.

The invention also provides a method for fixing at least one dowel according to the invention in a lightweight building board, comprising the following steps: introducing a hole into the lightweight building board, in particular a blind hole, inserting the first and the second dowel part into the hole, with the result that the fingers of the two dowel parts inter-engage at least in certain portions, applying ultrasonic energy to the dowel, with the result that, at least in the regions in which the dowel bears against the inner wall of the hole in the region of the first cover layer, the second cover layer and/or in the region of the core layer, the thermoplastic material of the dowel is brought into a pasty or free-flowing state, penetrates into the first cover layer, into the second cover layer and/or into the core layer, is connected to the material of the lightweight building board and, after switching off the ultrasonic energy, cools, with the result that the dowel is fixed in the lightweight building board in an integrally bonded and/or form-fitting manner.

Also provided according to the invention is an arrangement comprising a dowel according to the invention and a lightweight building board, wherein the fingers of the two dowel parts inter-engage at least in certain portions.

In a development of the invention, the first dowel part is fixed at least to the first cover layer, the second dowel part is fixed at least to the second cover layer and/or the first dowel part and the second dowel part are fixed to the core layer.

In a development of the invention, the fingers of the first and/or of the second dowel part are fixed at least in certain portions in the core layer of the lightweight building board.

BRIEF DESCRIPTION OF THE DRAWINGS

Further features and advantages of the invention will emerge from the claims and the following description of preferred embodiments of the invention. Here, individual features of the different embodiments presented in the figures and described in the description can be combined with one another in any desired manner without exceeding the scope of the invention. This also applies when individual features are combined with one another without further individual features with which they are shown or described in conjunction. In the drawings:

FIG. 1 shows a side view of a dowel according to the invention according to a first embodiment, FIG. 2 shows a plan view of the dowel of FIG. 1, FIG. 3 shows a side view of a conventional dowel, FIG. 4 shows a plan view of the dowel of FIG. 3, FIG. 5 shows a side view of a dowel according to the invention according to a second embodiment, FIG. 6 shows a plan view of the dowel of FIG. 5, FIG. 7 shows a lateral surface developed view of the dowel of FIG. 5.

DETAILED DESCRIPTION

Figure 8:
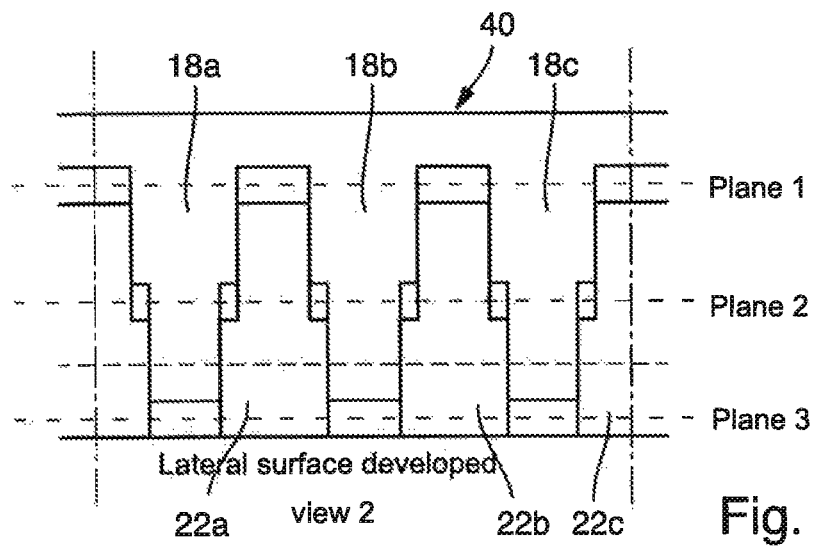
FIG. 8 shows a lateral surface developed view of a dowel according to the invention according to a third embodiment.

FIG. 1 shows a side view of a dowel 10 according to the invention according to a first embodiment of the invention. The dowel has a first dowel part 12 and a second dowel part 14 which are plugged into one another and supplement one another to form a cylindrical dowel. The first dowel part 12 has a ring-shaped basic body 16 from which a total of three fingers 18a, 18b and 18c emanate and extend downwardly in FIG. 1.

The second dowel part 14 has a basic body 20 which is concealed in FIG. 1 and which is indicated only by dashed lines in FIG. 1. A total of three fingers 22a, 22b and 22c extend upwardly from the basic body 20 in FIG. 1, with only one of these fingers 22a being visible in FIG. 1.

The two dowel parts 12, 14 are plugged into one another, and the fingers 18a, 18b, 18c of the first dowel part 12 and the fingers 22a, 22b, 22c of the second dowel part 14 supplement one another in the plugged-together state to form a circular-ring shaped wall of the dowel 10.

This can be seen in the plan view of the dowel 10 in FIG. 2. Although, per se, only the basic body 16 of the first dowel part 12 can be seen in the plan view of FIG. 2, the individual fingers. 18a to 18c and 22a to 22c are indicated by dashed lines. It is clear from this dashed illustration that the fingers 18a to 18c and 22a to 22c all have the same cross section and form polygonal segments of a circular ring. It can thus be seen in the illustration of FIG. 2 that the wall thickness of the dowel 12, which is defined by the wall thickness of the fingers 18a to 18c or 22a to 22c, is comparatively small and, as is illustrated in FIG. 2, is a. A screw channel SK is provided in the dowel 10. The dowel 10 thus has a diameter which results from the diameter of the screw channel SK and double the wall thickness a.

As a result, the dowel 10 according to the invention can be constructed with a considerably smaller diameter than conventional dowels.

For comparison, FIG. 3 illustrates a conventional dowel 24 for lightweight building boards. The illustration of the dowel 24 is purely schematic. The dowel 24 has a first dowel part 26 and a second dowel part 28, wherein the first dowel part 26 is designed as a piston element with a screw channel SK; see also FIG. 4. This first dowel part 26 in the form of a piston element is plugged into the second dowel part 28 in the form of a sleeve element. It can be readily gathered from FIG. 3 and FIG. 4 that the wall thickness of the dowel 24 is thus 2a. This wall thickness is made up of the wall thickness of the piston element or first dowel part 26 with the screw channel SK and the wall thickness of the sleeve element or of the second dowel part 28.

A comparison between FIGS. 1 and 2 on the one hand and FIGS. 3 and 4 on the other hand makes it immediately clear that the dowel 10 according to the invention as shown in FIGS. 1 and 2 has only half the wall thickness of the conventional dowel 24 as shown in FIGS. 3 and 4. This is achieved in the dowel 10 according to the invention by virtue of the fact that the first dowel part 12 and the second dowel part 14 each have a plurality of fingers 18a to 18c and 22a to 22c which extend parallel to a longitudinal direction of the dowel 10. In the first embodiment of the invention as shown in FIG. 1 and FIG. 2, these fingers 18a to 18c and 22a to 22c supplement one another to form a body having a circular-ring-shaped cross section.

FIG. 5 shows a dowel 30 according to the invention according to a second embodiment of the invention. The dowel 30 is of similar design to the dowel 10 of FIGS. 1 and 2, and therefore only the differences over the dowel 10 will be explained. The dowel 30 has a first dowel part 32 and a second dowel part 34 which are displaceable relative to one another and are plugged into one another in the assembly-ready state of FIG. 5. The first dowel part 32 has a basic body 16 from which a total of three fingers 18a, 18b and 18c extend, downwardly in FIG. 5. This can also be gathered from the plan view of the dowel 30 of FIG. 6, where the individual fingers of the two dowel parts are indicated by dashed lines.

The second dowel part 34 likewise has a basic body 20, only certain portions of which can be seen in FIG. 5. This basic body 20 is of plate-like configuration, and three fingers 22a, 22b, 22c extend, upwardly in FIG. 5, from the outer circumference of the basic body 20. As can be seen from the plan view of FIG. 6, the fingers 18a to 18c of the first dowel part 32 and the fingers 22a to 22c of the second dowel part have, as in the case of the dowel 10 of FIGS. 1 and 2, in each case a cross section in the form of a circular ring segment and, in the state in which the first dowel part 32 and the second dowel part 34 are plugged into one another, supplement one another to form a cross section in the form of a circular ring.

It can be seen in FIG. 5 that, starting from the position illustrated, the first dowel part 32 could be pushed still somewhat further downward in the direction of the second dowel part 34 until the upper free end of the finger 22a bears against the lower side of the basic body 16 of the first dowel part 32. In the same way, the free ends of the fingers 22b, 22c then bear against the lower side of the basic body 16 of the first dowel part 32, and the free ends of the fingers 18a, 18b, 18c of the first dowel part 32 would then bear against the bottom of a hole which has been introduced into a lightweight building board. If ultrasonic energy is then applied to the dowel 30 from the upper side of the basic body 16 of the first dowel part 32, the thermoplastic material of the dowel 30 will, inter alia, be heated in the region of the contact points of the fingers 22a, 22b, 22c with the basic body 16 of the first dowel part 32 and brought into a pasty state or liquefied, and the thermoplastic material of the dowel 30 will consequently penetrate into the first cover layer, into the second cover layer and/or into the core layer. This also occurs in the region of the contact points of the free ends of the fingers 18a, 18b, 18c with the bottom of the hole in the lightweight building board. After switching off the ultrasonic energy, the thermoplastic material cools and solidifies again and an integrally bonded connection and/or form-fitting connection can be achieved between the dowel 30 and the lightweight building board.

FIG. 7 shows a developed view of the lateral surface of the dowel 30 of FIG. 5. What can clearly be seen in this view are the fingers 18a, 18b, 18c of the first dowel part 32 and the fingers 22a, 22b, 22c of the second dowel part 34, which inter-engage such that the lateral surfaces of adjacent fingers bear against one another.

Also depicted in FIG. 7 are two planes, plane 1 and plane 2. In the region of the plane 1, the free ends of the fingers 22a, 22b, 22c of the second dowel part 34 contact the lower side of the basic body 16 of the first dowel part, cf. FIG. 1, and in the region of the plane 1, upon introduction of ultrasonic energy, the thermoplastic material of the dowel 30 will consequently liquefy and a form-fitting connection and/or integrally bonded connection with a lightweight building board and an integrally bonded connection between the first dowel part 32 and the second dowel part 34 can be produced. In the same way, in the region of the plane 2, the free ends of the fingers 18a, 18b, 18c of the first dowel part 32 contact the bottom of a hole in a lightweight building board. Upon introduction of ultrasonic energy, the thermoplastic material of the dowel 30 then also liquefies in this region and a form-fitting connection and/or integrally bonded connection with the lightweight building board can be produced in the region of the plane 2.

The plane 1 is advantageously arranged such that it is situated slightly below the upper cover layer of a lightweight building board, with the result that an undercut can be achieved with respect to the upper cover layer by virtue of the liquefied and resolidified material of the dowel 30 that penetrates to a certain extent into the core layer at the transition between the upper cover layer and the core layer.

FIG. 8 shows a lateral surface developed view of a dowel 40 according to the invention according to a third embodiment of the invention. Unlike the dowel 30 of FIGS. 5 to 7, the fingers 18a, 18b, 18c of the first dowel part and the fingers 22a, 22b, 22c of the second dowel part have a stepped design in the longitudinal direction of the dowel 40, wherein the steps of the fingers 18a to 18c are situated at the same height, and the two-sided steps of the fingers 22a to 22c are likewise situated at the same height. Pushing together the two dowel parts of the dowel 40 thus results in three planes, in FIG. 8 plane 1, plane 2 and plane 3, in which ultrasonic energy introduced into the dowel 40 leads to a liquefaction of the thermoplastic material of the dowel and thus to a form-fitting connection and/or integrally bonded connection between the two dowel parts and with the lightweight building board. In FIG. 8, the additional plane is the plane 2, which is arranged centrally between the plane 1 and the plane 3. In the plane 2, the steps on the two lateral surfaces of the fingers 18a, 18b and 18c coincide with the steps on the lateral surfaces of the fingers 22a, 22b and 22c. The central plane 2 is situated in the region of the core layer of a lightweight building board. It is also possible in this way for an integrally bonded connection and/or form-fitting connection to be achieved with a suitable material of a core layer of a lightweight building board. Moreover, the steps on the fingers 18a to 18c and on the fingers 22a to 22c also ensure a defined length of the dowel 40 in the completely pushed-together state.

Figure 9:
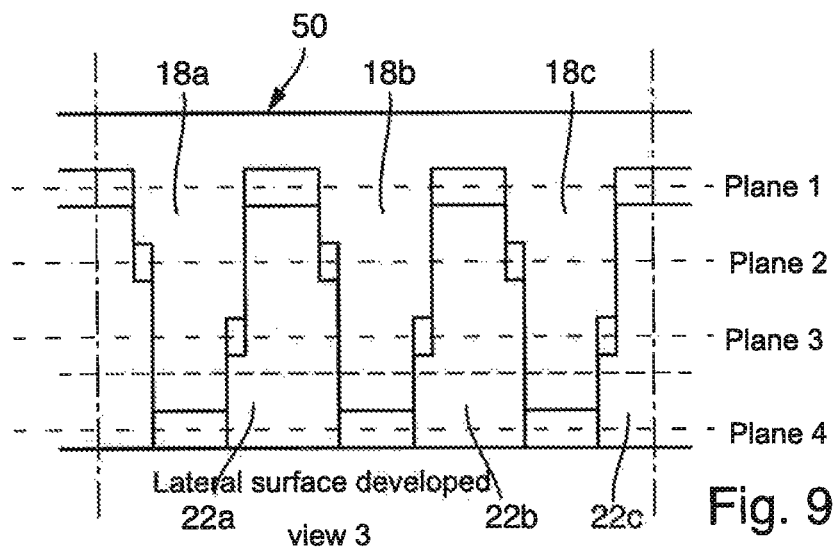
FIG. 9 shows a lateral surface developed view of a dowel according to the invention according to a fourth embodiment.

FIG. 9 shows a lateral surface developed view of a dowel 50 according to the invention according to a fourth embodiment of the invention. Unlike the dowel 40 of FIG. 8, the lateral surfaces of the fingers 18a, 18b, 18c of the first dowel part and the fingers 22a, 22b, 22c of the second dowel part have a step design such that the steps butt against one another in two different planes, plane 2 and plane 3. For this purpose, the steps of the fingers 18a to 18c and 22a to 22c are offset with respect to one another in the longitudinal direction of the dowel 50. The respective right-hand steps of the fingers 18a, 18b, 18c in FIG. 9 are arranged on the plane 3 and thus lower than the respective left-hand steps of the fingers 18a, 18b, 18c, which are arranged on the plane 2.

After completely pushing together the two dowel parts of the dowel 50 and after introducing ultrasonic energy, the thermoplastic material of the dowel 50 thus also liquefies in the region of four planes, namely plane 1, plane 2, plane 3 and plane 4, with the result that, after the cooling of the material, an integrally bonded connection and/or form-fitting connection can be achieved on four different planes or levels of the lightweight building board.

Figure 10:
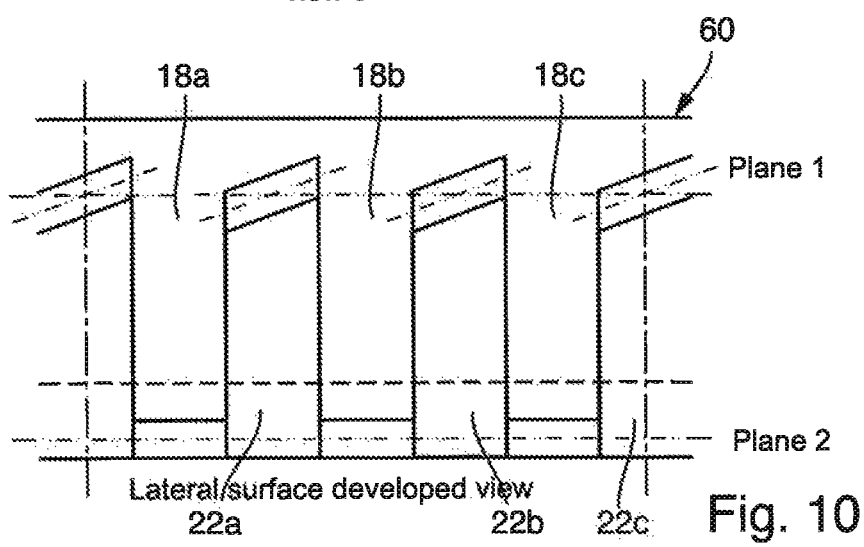
FIG. 10 shows a lateral surface developed view of a dowel according to the invention according to a fifth embodiment.

FIG. 10 shows a lateral surface developed view of a dowel 60 according to the invention according to a fifth embodiment of the invention. Here, the fingers 18a, 18b, 18c of the first dowel part are of identical design to the fingers of the dowel 30 of FIGS. 5 to 7 and have, at their respective free end, an end surface which extends parallel to the circumference of the dowel 60. By contrast, the fingers 22a, 22b and 22c of the second dowel part are bevelled at their free ends, with the result that, in the lateral surface developed view of FIG. 10, the end surface of the fingers 22a, 22b, 22c extends in an ascending manner from left to right. The corresponding counter-surfaces on the basic body of the first dowel part are likewise configured to ascend from left to right in the lateral surface developed view of FIG. 10. A contact of the end surfaces of the fingers 22a, 22b, 22c with the basic body of the first dowel part thus does not occur exactly in the plane 1, but extending obliquely to the plane 1 and centrally intersecting the plane 1. Consequently, when fixing the dowel in the lightweight building board, a form-fitting connection or integrally bonded connection also occurs not only exactly at the level of the plane 1 but also in the region above and below. This makes it possible in a very simple manner to compensate for tolerances of the lightweight building board and/or of the dowel 60. In the case of the dowel 60, the free ends of the fingers 18a, 18b, 18c are designed to extend perpendicularly to the longitudinal axis of the dowel since, when fixing the dowel, they come into contact with the bottom of a blind hole in the lightweight building board.

Figure 11:
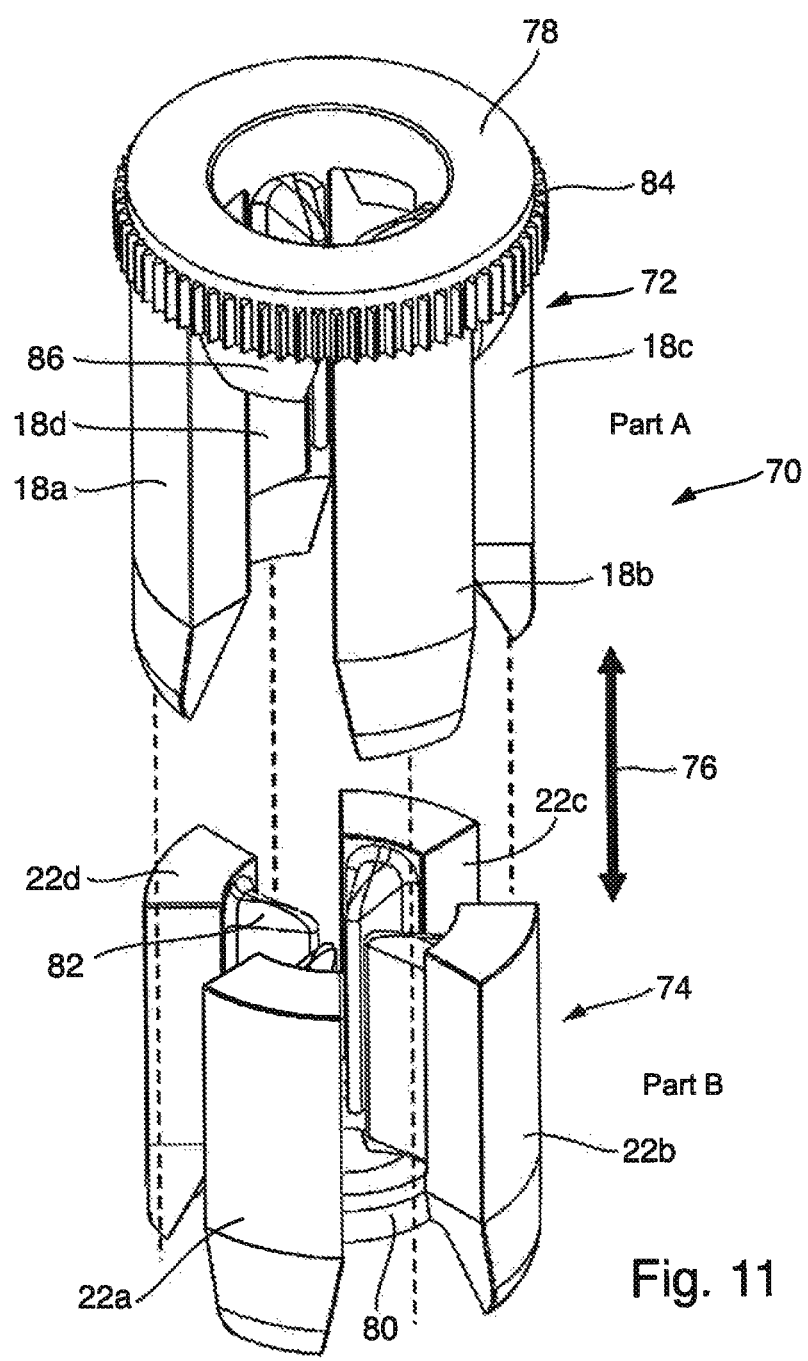
FIG. 11 shows a dowel according to the invention according to a sixth embodiment in the pulled-apart state.

FIG. 11 shows a dowel 70 according to the invention according to a sixth embodiment of the invention in the pulled-apart state. The dowel 70 has a first dowel part 72 and a second dowel part 74 which, as is indicated by a double arrow 76, can be plugged into one another and pulled apart again.

The first dowel part 72 has a circular-ring-disc-shaped basic body 78 from which a total of four fingers 18a, 18b, 18c and 18d emanate and extend downwardly in FIG. 11. Each of the fingers 18a to 18d has, over a part of its length, a circular-ring-segment shape in cross section.

The second dowel part 74 has a circular-ring-disc-shaped basic body 80 from which a total of four fingers 22a, 22b, 22c and 22d extend upwardly. Each of the fingers 22a to 22d has, over a portion of its length, a cross section in the form of a circular-ring segment. The two dowel parts 72, 74 can be plugged into one another along the direction of the arrow 76, with the result that the fingers 18*a* to 18*d* and the fingers 22*a* to 22*d* then supplement one another to form a cylindrical wall.

Each of the fingers 18*a* to 18*d* and each of the fingers 22*a* to 22*d* is provided on its radially inner side with a projection 82, wherein these projections 82 each extend over most of the length of the fingers 18*a* to 18*d* or 22*a* to 22*d*. The projections 82 are triangular in cross section with a rounded-off or cut-off tip. In the pushed-together state of the two dowel parts 72, 74, the projections 82 form a screw channel which extends parallel to the longitudinal axis of the dowel 70. In the illustration of FIG. 11, the longitudinal axis extends parallel to the arrow 76 through the centre of the first dowel part 72 and of the second dowel part 74.

The basic body 78 of the first dowel part 72 is provided on its outer circumference with numerous small projections 84 extending in the longitudinal direction. When fixing the dowel in a lightweight building board, these projections 84 engage on the inner wall of a hole in the lightweight building board in the region of its cover layer. Upon introduction of ultrasonic energy, the material of the projections 84 heats and liquefies or is at least converted into a pasty state. The material of the projections 84 then ensures a form-fitting connection and/or integrally bonded connection with the material of the lightweight building board, in particular with the material of the cover layer of the lightweight building board.

On a lower side of the basic body 78 there are provided, between each of the fingers 18*a* to 18*d*, downwardly tapering projections 86. When pushing together the two dowel parts 72, 74, these projections 86 come into contact with the upper sides of the fingers 22*a* to 22*d* of the second dowel part 74. Upon introduction of ultrasonic energy, these tapering projections 86 thus orient the ultrasonic energy onto the contact region between the projections 86 and the fingers 22*a* to 22*d*, with the result that the thermoplastic material of the dowel 70 heats and liquefies in these contact regions or at least passes into a pasty state. When fixing the dowel 70, it is thus possible to achieve an integrally bonded connection between the two dowel parts 72, 74 and, where appropriate, additionally an integrally bonded connection and/or form-fitting connection with the material of the lightweight building board.

The free ends of the fingers 18*a* to 18*d* taper and each run out in an edge which is situated parallel to the circumferential direction and perpendicular to the longitudinal direction. This edge contacts the bottom of a blind hole in the lightweight building board when fixing the dowel and, upon introduction of ultrasonic energy, the ultrasonic energy is introduced into the region of this edge, and therefore a heating and liquefaction or generation of a pasty state of the thermoplastic material, and consequently an integrally bonded connection and/or form-fitting connection with the material of the lightweight building board, can also occur in the region of this edge.

In the same way, the bottom free ends of the fingers 22*a* to 22*d* of the second dowel part 74, which are also situated below the basic body 80, are also of tapered configuration and run out in an edge which extends parallel to the circumferential direction and perpendicular to the longitudinal direction of the dowel 70. The fingers 22*a* to 22*d* contact the bottom of a hole in the lightweight building board in the region of this edge or these edges, and, after the introduction of ultrasonic energy and the solidification of the thermoplastic material, an integrally bonded connection and/or form-fitting connection with the material of the lightweight building board will also occur in these regions. Here, the ultrasonic energy is introduced from the upper side of the basic body 78 of the first dowel part and introduced via the tapering projections 86 on the lower side of the basic body 78 into the fingers 22*a* to 22*d* and then transmitted further to the bottom tapering ends of the fingers 22*a* to 22*d*.

Figure 12:
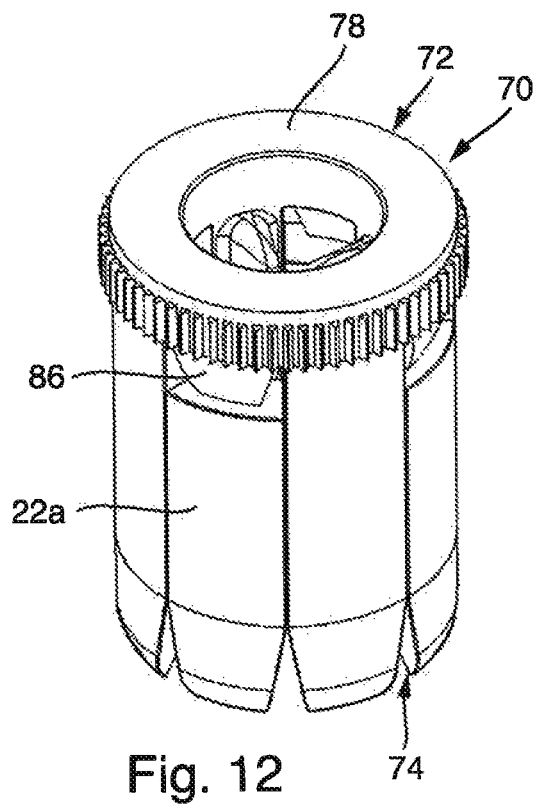
FIG. 12 shows the dowel of FIG. 11 in the pushed-together state obliquely from above.

FIG. 12 shows the dowel 70 of FIG. 11 with the two dowel parts 72, 74 in the pushed-together state. It can be seen that the projections 86 on the lower side of the basic body 78 of the first dowel part 72 now bear against the upper free ends of the fingers 22*a* to 22*d* of the second dowel part 74, and that the edges at the lower end of the fingers 18*a* to 18*d* and of the fingers 22*a* to 22*d* are situated at the same height.

Figure 13:
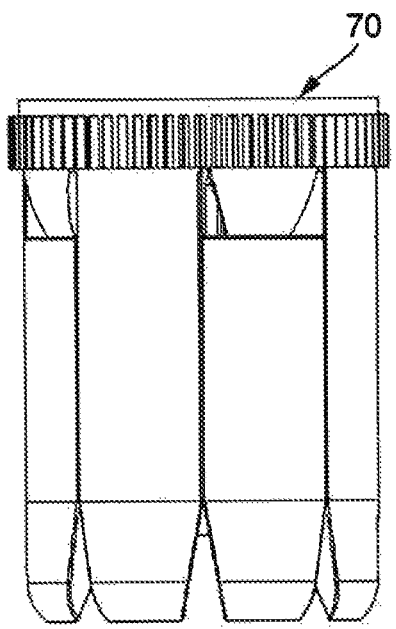
FIG. 13 shows the dowel of FIG. 12 in a side view.

FIG. 13 shows the dowel 70 of FIGS. 11 and 12 in a side view.

Figure 14:
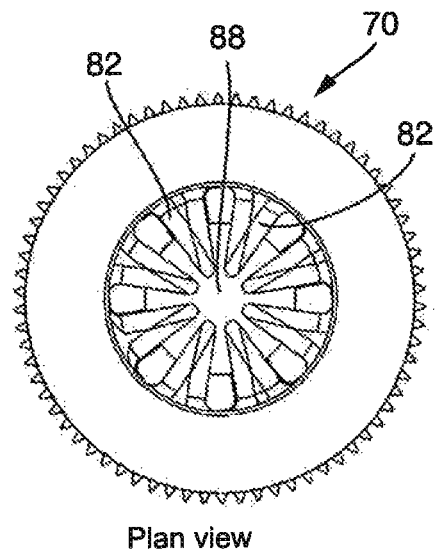
FIG. 14 shows the dowel of FIG. 12 in a plan view.

FIG. 14 shows the dowel 70 in a plan view. The plan view reveals the screw channel 88 which extends parallel to the centre longitudinal axis of the dowel 70 and which is formed by the radially inwardly protruding projections 82 of the FIGS. 18*a* to 18*d* and of the fingers 22*a* to 22*d*, cf. FIG. 11.

Figure 15:
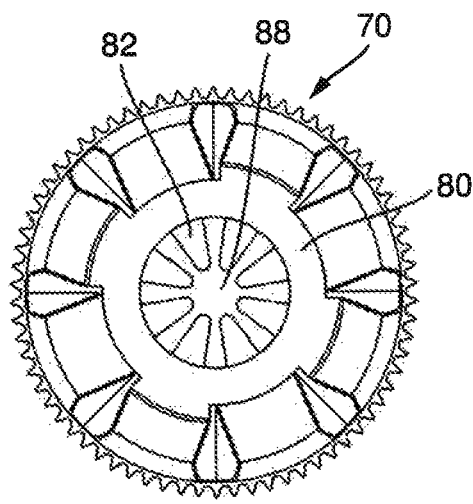
FIG. 15 shows the dowel of FIG. 12 in a view from below.

FIG. 15 shows a view of the dowel 70 from below. The screw channel 88 formed by the projections 82 can clearly be seen in this view, too. This view also reveals the basic body 80 of the second dowel part 74.

Figures 16, 17:
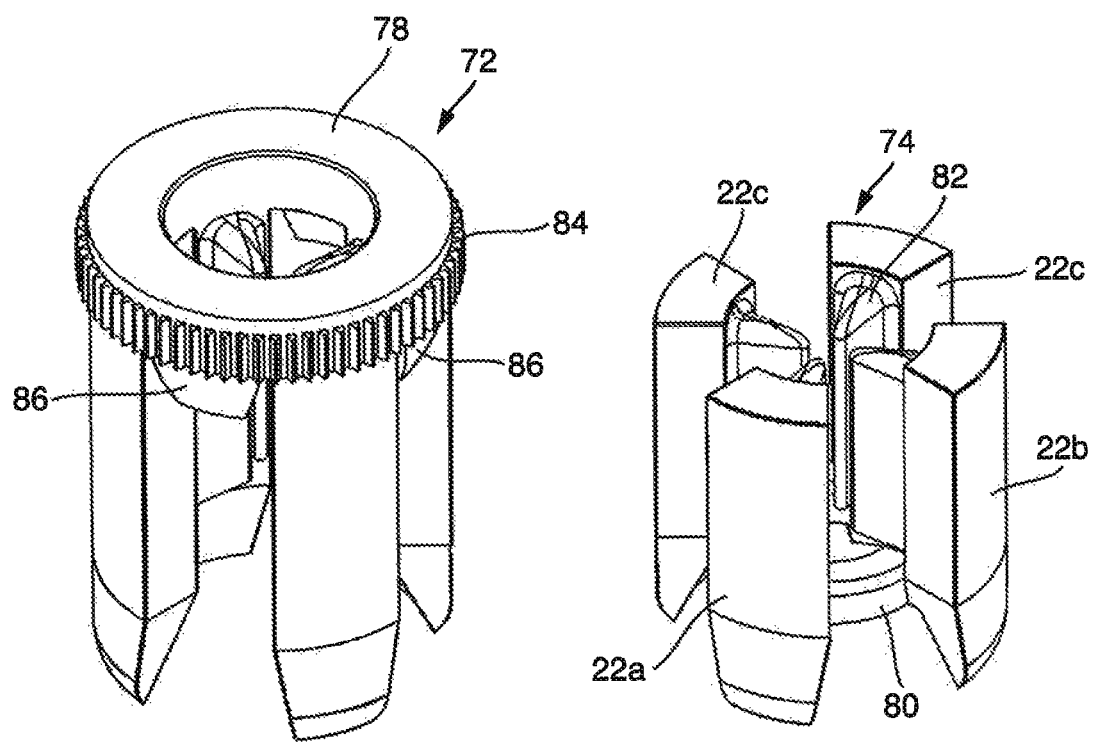
FIG. 16 shows the first dowel part of the dowel of FIG. 12 obliquely from above.
FIG. 17 shows the second dowel part of the dowel of FIG. 12 obliquely from above.

FIG. 16 shows the first dowel part 72 in a view obliquely from above, and FIG. 17 shows the second dowel part 74 in a view obliquely from above. FIG. 17 clearly reveals the attachment of the fingers 22*a* to 22*c* to the basic body 80 of the second dowel part 74. The basic body 80 is circular-ring-shaped. The projections 82 on the radially situated inner sides of the fingers 22*a* to 22*c* are connected to the basic body 80 and project to a certain extent beyond the inner opening of the basic body 80.

The dowel parts 72, 74 are preferably formed in one piece from a thermoplastic, in particular in a plastic injection-moulding process. The dowel according to the invention can also be produced in a two-component injection-moulding process, a so-called overmoulding injection-moulding process, from identical or different materials or substances. Such processes make it possible, for example, to ensure that the first dowel part and the second dowel part readily adhere to one another and, prior to assembly, do not have to be mounted or plugged together. Upon application of ultrasonic energy, the first and the second dowel part are readily released from one another again and are then displaceable relative to one another.

Figure 18:
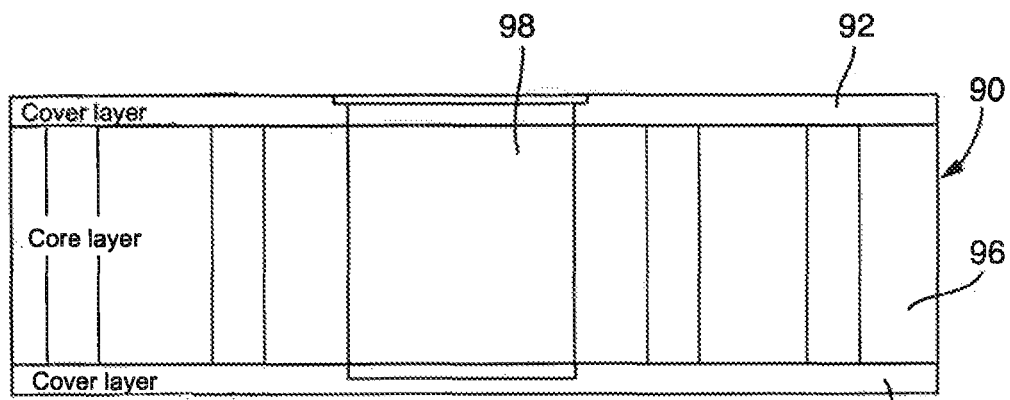
FIGS. 18, 19 and 20 show method steps of the method according to the invention for fixing a dowel in a lightweight building board in a schematic illustration.
Figure 19:
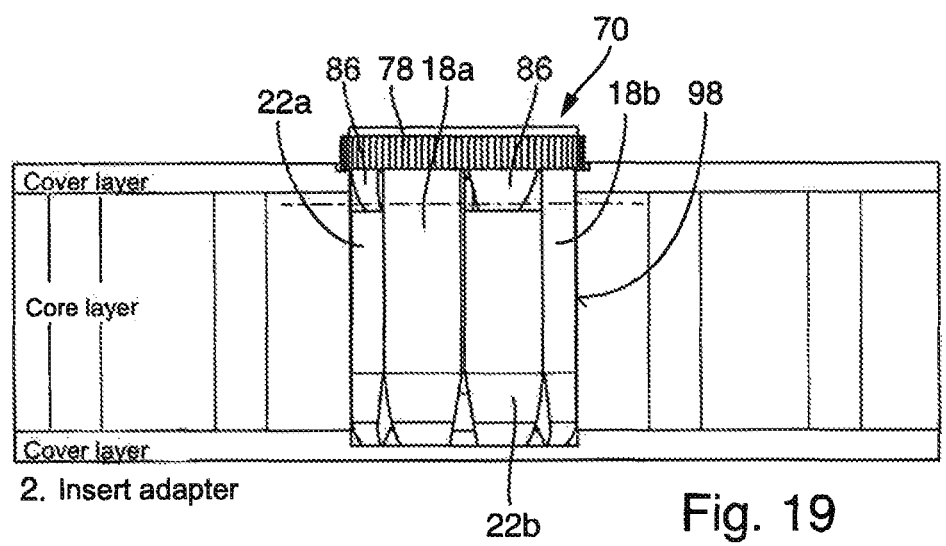
Figure 20:
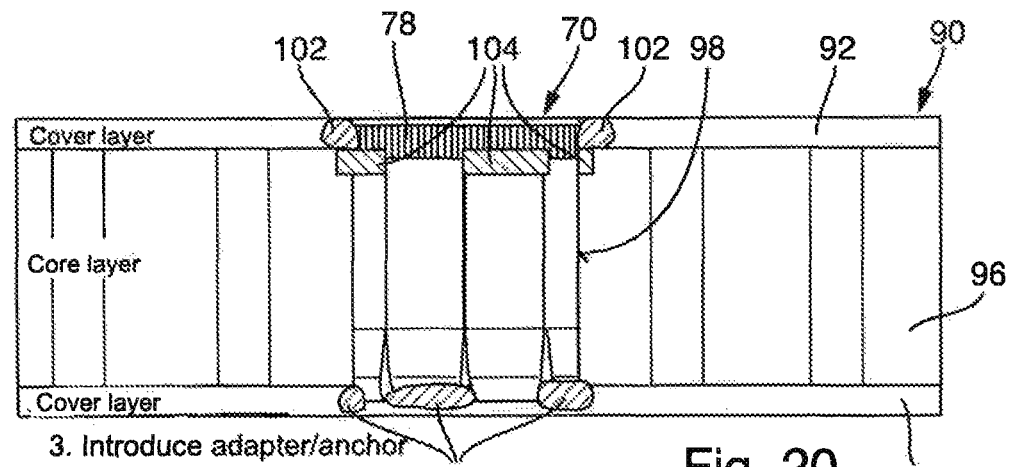

FIGS. 18 to 20 show method steps of the method according to the invention when fixing the dowel 70 according to the invention in a lightweight building board 90. The lightweight building board 90 has a first cover layer 92 made of compact pressure-resistant material and a second, lower cover layer 94 likewise made of compact, pressure-resistant material. Between the two cover layers 92, 94 there is provided a core layer 96 of a material having a lower density than the cover layers. The core layer has a substantially greater thickness than the cover layers 92, 94, approximately eight times the thickness of a cover layer 92, 94 in the illustrated embodiment of the lightweight building board. The core layer can consist of paper honeycombs, foam or else solid wood of low density, for example balsa wood.

A blind hole 98 is introduced into the lightweight building board 90 from the side of the upper, first cover layer 92 in FIG. 18. The blind hole 98 extends completely through the first cover layer 92 and the core layer 96. From the upper inner side of the lower, second cover layer 94, the blind hole extends only to a certain extent into the second cover layer 94.

From the upper side of the first cover layer 92, the diameter of the blind hole 98 is somewhat enlarged, resulting in a flat region having a larger diameter than the remainder of the blind hole 98. This larger diameter is tailored to the outside diameter of the projections 84 on the first dowel part 72, cf. FIG. 11.

According to FIG. 19, the dowel 70 according to the invention is now inserted into the blind hole 98 until the free ends of the fingers 18a, 18b, 18c and 18d bear against the bottom of the blind hole 98. The lower ends of the fingers 22a, 22b likewise bear against the bottom of the blind hole. The lower free ends of the projections 86 which emanate from the basic body 78 of the first dowel part 72, cf. FIG. 11, lie on the upper free ends of the fingers 22a, 22b, 22c, 22d of the second dowel part 74.

Starting from the state of FIG. 19, ultrasonic energy is now applied to the upper side of the first dowel part, that is to say to the upper side of the basic body 78 of the first dowel part. The thermoplastic material of the dowel is now strongly heated at the contact points of the dowel 70 with the material of the two cover layers 92, 94 and liquefies or is at least brought into a pasty state. These are the regions in which the free lower ends of the fingers 18a, 18b, 18c, 18d contact the bottom of the blind hole and the regions in which the lower ends of the fingers 22a, 22b, 22c, 22d likewise contact the bottom of the blind hole 98. A form-fitting connection and/or integrally bonded connection between the dowel 70 and the material of the second cover layer 94 will form in these regions. These regions are schematically designated in FIG. 20 by the reference sign 100.

Moreover, the material of the dowel 70 will strongly heat in the region of the projections 84 on the outer circumference of the basic body 78 and liquefy or pass into a pasty state. An integrally bonded and/or form-fitting connection with the material of the first cover layer 92 occurs in this region. These regions are designated in FIG. 20 by the reference sign 102.

Moreover, the thermoplastic material of the projections 86 of the first dowel part will strongly heat at the contact point of the projections 86 with the free ends of the fingers 22a, 22b, 22c and 22d and liquefy or pass into a pasty state. In this state there occurs an integrally bonded connection between the first dowel part 72 and the second dowel part 74 and, where appropriate, additionally a form-fitting and/or integrally bonded connection with the material of the core layer 96 of the lightweight building board 90. These regions are designated in FIG. 20 by the reference sign 104. It can be seen from the illustration of FIG. 20 that the regions 104 form an undercut of the first cover layer 92. This can result in an increased strength or more stable fixing of the dowel 70 in the lightweight building board 90.

Figure 21:
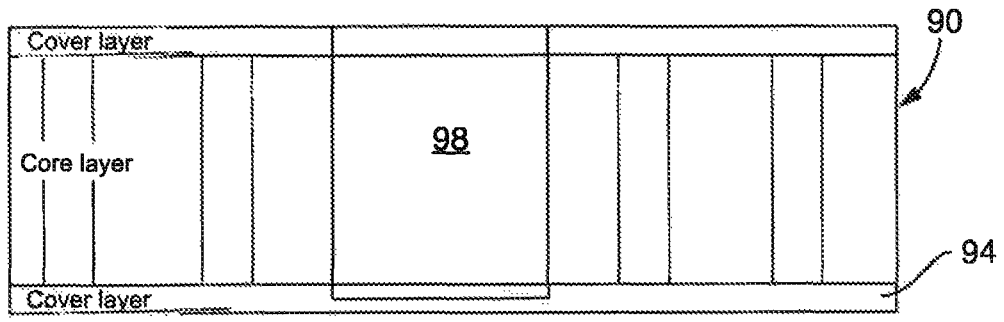
FIGS. 21, 22 and 23 show alternatives in the method step according to the invention for introducing a blind hole.
Figure 22:
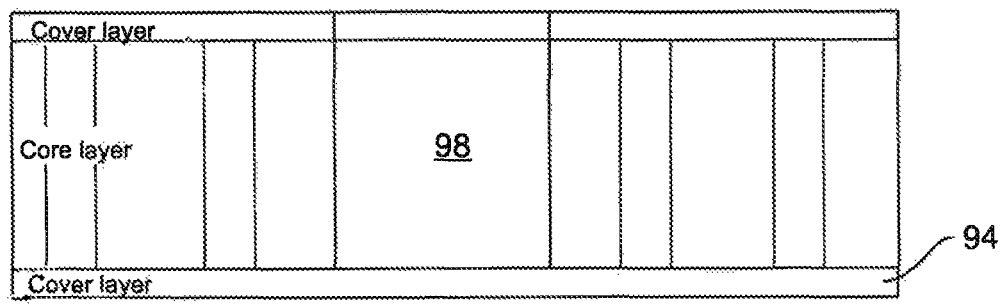
Figure 23:
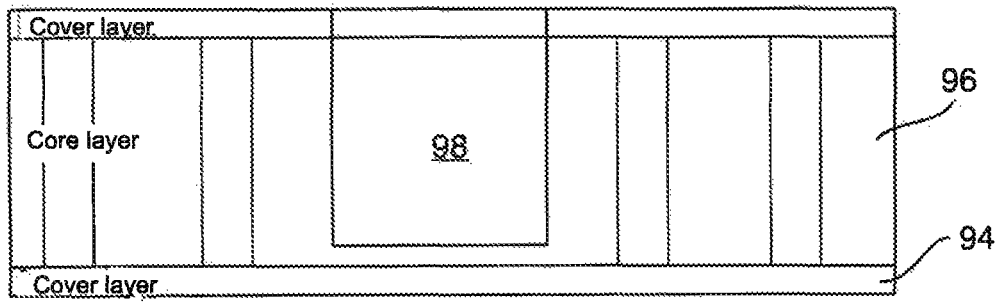

FIGS. 21 to 23 show alternative configurations of a blind hole 98 in the lightweight building board 90. In the illustration of FIG. 21, the blind hole 98 extends still to a certain extent into the lower cover layer 94 of the lightweight building board 90, but without completely traversing it.

In the illustration of FIG. 22, the blind hole 98 ends on the inner side of the second or lower cover layer 94.

In the illustration of FIG. 23, the blind hole 98 ends still in the core layer 96. The dowel according to the invention can be inserted into blind holes 98 of different design, especially into blind holes 98 as shown in FIG. 18, FIG. 21, FIG. 22 or FIG. 23. The design of the blind hole shown in FIG. 23 is customarily chosen if the core layer 96 consists of more stable material, for example of lightweight solid wood, in particular balsa wood.

Figure 24:
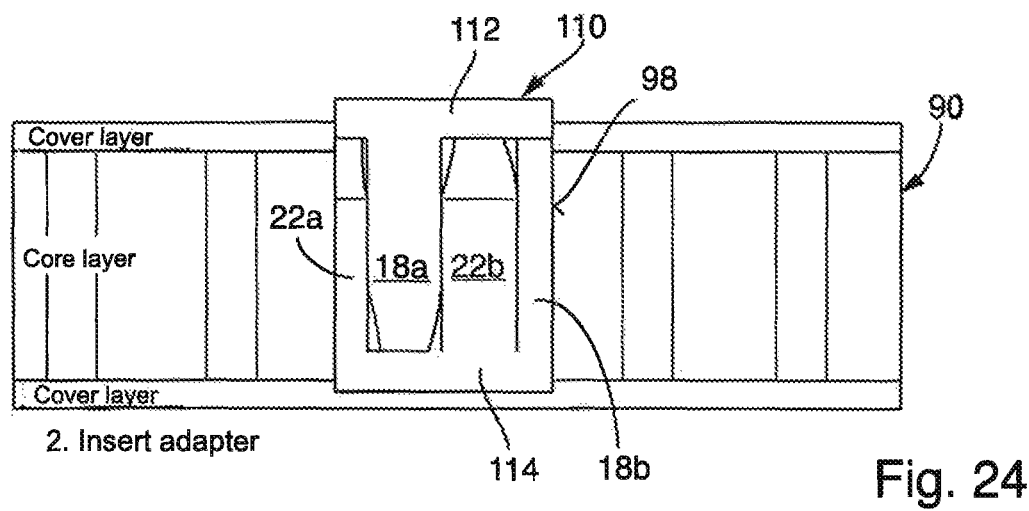
FIG. 24 shows a method step of the method according to the invention when inserting a dowel according to the invention according to a seventh embodiment.

FIG. 24 shows a dowel 110 according to the invention according to a further embodiment of the invention. The dowel 110 has two dowel parts 112, 114 which are designed identically to one another. Here, the dowel parts 112, 114 have the same design as the first dowel part 72 which is illustrated in FIG. 16, with the exception that the projections 84 on the outer circumference of the basic body 78 and the projections 86 on the lower side of the basic body 78 have been omitted.

Figure 25:
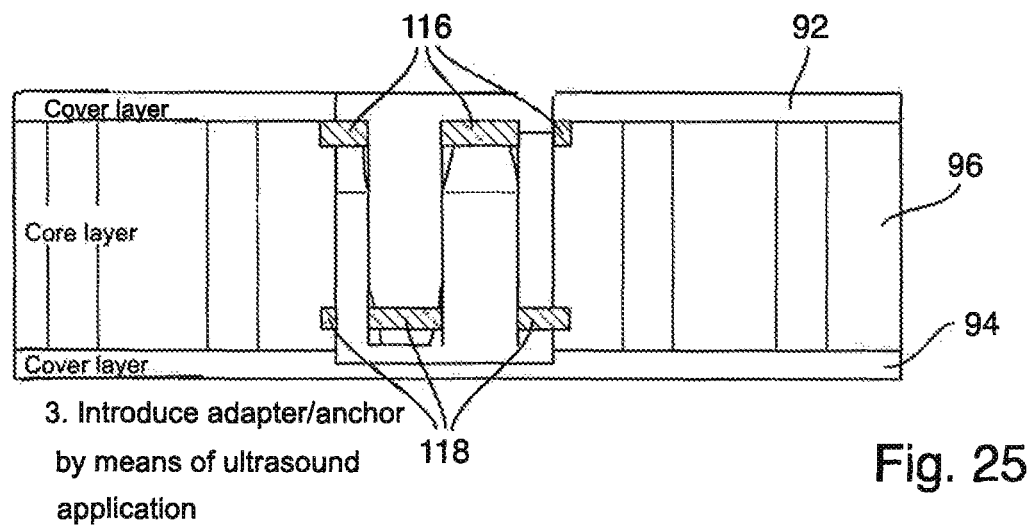
FIG. 25 shows a further method step, which follows the method step of FIG. 24, in a schematic illustration.

If, as is illustrated in FIG. 24, the dowel 110 is now introduced into a blind hole 98 in the lightweight building board 90 and then, see FIG. 25, subjected to ultrasonic energy from the upper side of the dowel 110, the thermoplastic material of the dowel 110 will heat only in the region of the contact points between the free ends of the fingers 18a, 18b, 18c, 18d with the basic body of the second dowel part 114 and in the contact regions of the free ends of the fingers 22a, 22b, 22c, 22d with the basic body of the first dowel part 112 and liquefy or pass into a pasty state.

As a result, on the one hand, the first dowel part 112 will be connected in an integrally bonded manner to the second dowel part 114 in these regions, which are designated in FIG. 25 by the reference signs 116 and 118. However, as can be seen in FIG. 25, the regions 116 simultaneously form undercuts on the first cover layer 92. The regions 118 form undercuts with the material of the core layer 96. In the region of the undercuts of the regions 116, 118 there can be achieved not only a form-fitting connection but, where appropriate, additionally an integrally bonded connection with the material of the first cover layer 92 and the material of the core layer 96 or, in the case of the regions 118, not only a form-fitting connection but also an integrally bonded connection with the material of the core layer 96.

Figure 26:
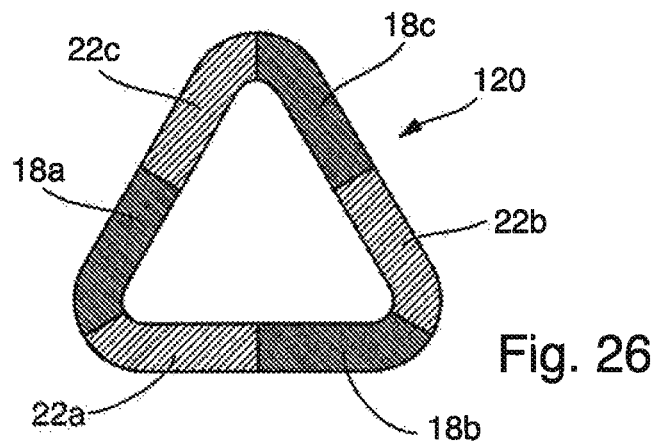
FIG. 26 shows a schematic sectional view of a dowel according to the invention according to an eighth embodiment.

FIG. 26 schematically shows the cross section of a dowel 120 according to the invention according to a further embodiment of the invention. The dowel 120 is ring-shaped and has the cross section of a triangle with rounded-off corners. The wall of the dowel 120 is formed by ring segments, and formed by in each case three fingers 18a, 18b, 18c of the first dowel part and three fingers 22a, 22b, 22c of the second dowel part. By virtue of the rounded-off corners, an appropriate blind hole for the dowel 120 can be produced by means of a milling cutter, for example.

Figure 27:
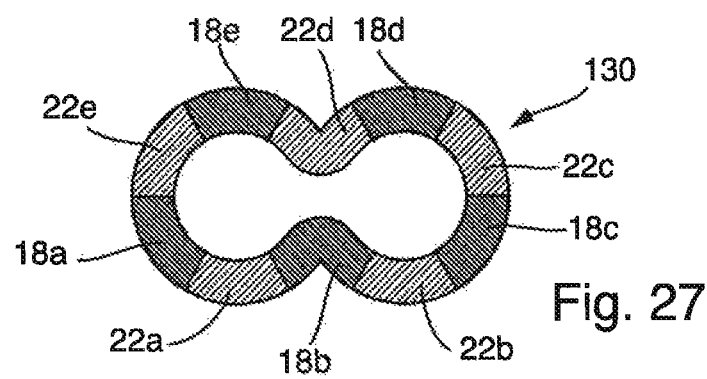
FIG. 27 shows a schematic sectional view of a dowel according to the invention according to a ninth embodiment.

FIG. 27 schematically shows the cross section of a further dowel 130 according to the invention. The dowel 130 has the cross-sectional shape of a horizontal eight. A hollow interior of the dowel 130 likewise has the shape of a horizontal eight. The wall of the dowel 130 is formed by five fingers 18a, 18b, 18c, 18d and 18e of a first dowel part and five fingers 22a, 22b, 22c, 22d and 22e of a second dowel part, wherein the lateral surfaces of adjacent fingers 18a to 18e and 22a to 22e bear against one another.

Figure 28:
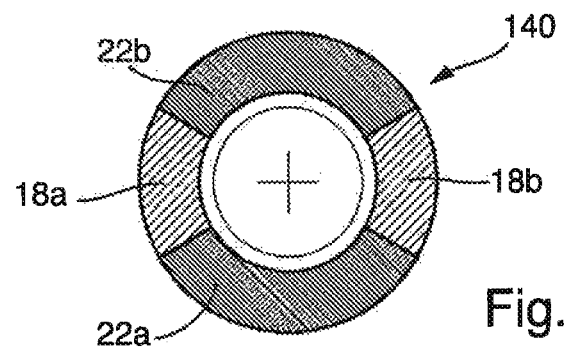
FIG. 28 shows a schematic sectional view of a dowel according to the invention according to a tenth embodiment.

FIG. 28 schematically shows a cross section of a further dowel 140 according to the invention. The dowel 140 differs from the dowel 30 of FIGS. 5 to 7 only in that the first dowel part has only two fingers 18a, 18b and the second dowel part likewise has only two fingers 22a, 22b. The fingers 18a, 18b and 22a, 22b each form circular ring segments in cross section. However, as seen over the circumference, the fingers 22a, 22b extend over a greater length than the fingers 18a, 18b.

Figure 29:
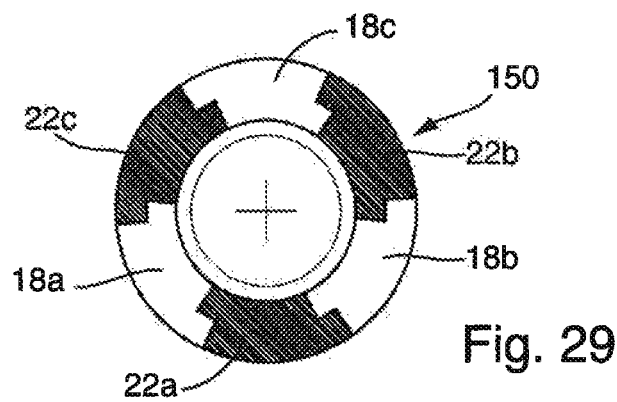
FIG. 29 shows a schematic sectional view of a dowel according to the invention according to an eleventh embodiment.

FIG. 29 shows a cross section of a further dowel 150 according to the invention. The section plane of FIG. 29 is perpendicular to the longitudinal axis of the dowel 150. The dowel 150 has a circular-ring-shaped cross section which is formed by three fingers 18a, 18b, 18c of a first dowel part and three fingers 22a, 22b, 22c of a second dowel part. The lateral surfaces of adjacent fingers 18a to 18c and 22a to 22c bear against one another. The lateral surfaces of the fingers 18a to 18c and 22a to 22c have a stepped design in the radial direction. As a result, the fingers 18a to 18c and 22a to 22c are guided on one another in the longitudinal direction of the dowel 150 and can deflect only slightly, if at all, in the radial direction.

Figure 30:
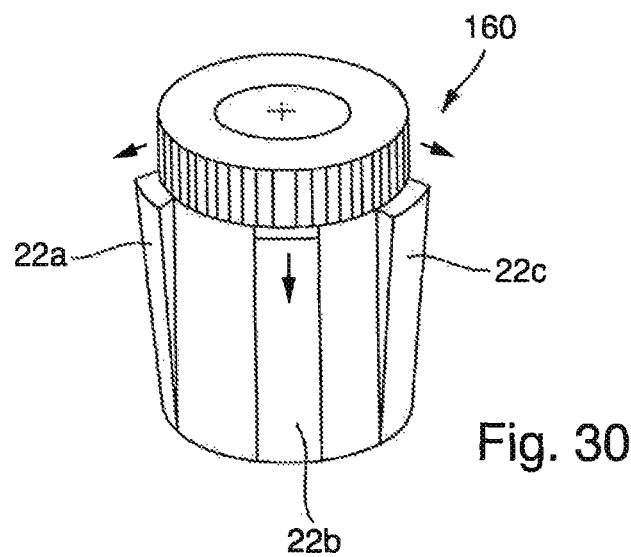
FIG. 30 shows a schematic illustration of a dowel according to the invention according to a twelfth embodiment.

FIG. 30 schematically shows a further dowel 160 according to the invention in a view obliquely from above. Here, the free ends of the fingers of the second dowel part and the lower side of the basic body of the first dowel part are formed in such a way that, when pushing together the two dowel parts, the free ends of the fingers 22a, 22b, 22c of the second dowel part spread radially outwardly. It is also possible thereby for an undercut on the first cover layer of a lightweight building board to be achieved. Alternatively or additionally, the lateral surfaces of the fingers can also be formed in such a way that radial spreading of the dowel occurs when pushing together the two dowel parts. The configuration of the lateral surfaces of the fingers is independent of the configuration of the end surfaces of the fingers.

Figure 31:
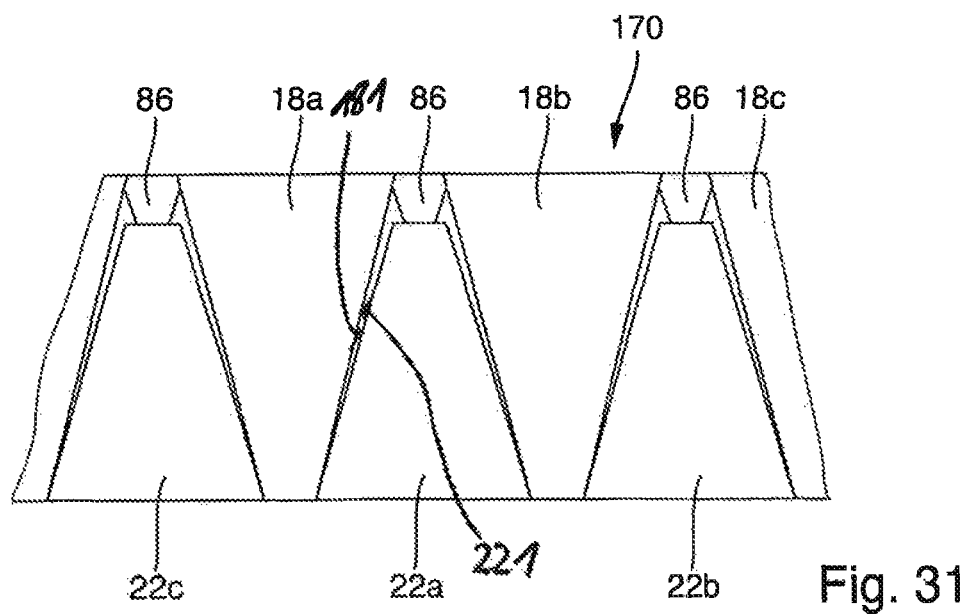
FIG. 31 shows a lateral surface developed view of a dowel according to the invention according to a thirteenth embodiment.

FIG. 31 shows the lateral surface developed view of a further dowel 170 according to the invention. As seen in the lateral surface developed view, the fingers 18a, 18b and 18c of the first dowel part taper downwardly here. The fingers 18a, 18b, 18c thus each have the shape of a triangle with a cut-off tip. The fingers 22a, 22b, 22c of the second dowel part are formed in the same way. In the state in which the two dowel parts are plugged into one another, when the lateral surfaces of adjacent fingers 18a to 18c and 22a to 22c bear against one another, the fingers form a continuous cylindrical wall of the dowel 170. The first dowel part has projections 86 which extend downwardly starting from a basic body of the first dowel part and, in the state in which the dowel parts are plugged into one another, contact the free ends of the fingers 22a, 22b, 22c.

In the embodiment of FIG. 31, the lateral surfaces of the fingers 18a, 18b, 18c and 22a to 22c can be provided with energy flow directors in the form of projections which, in FIG. 31, are indicated only schematically at only one point by the reference signs 181 and 221. As schematically illustrated, such projections 181, 221 can be configured as locally limited elevations, but also for example projections which are continuous over the complete length of the lateral surface, but also for example on the one hand as projections and on the other hand as depressions. Such energy flow directors which are known in principle ensure that the lateral surfaces of the fingers 18a to 18c melt together with the lateral surfaces of the fingers 22a to 22c upon introduction of ultrasonic energy. Where appropriate, a connection to the core layer of a lightweight building board can also be achieved in this way. The thermoplastic material of the fingers 18a to 18c and 22a to 22c which is heated by the introduction of ultrasonic energy and is then pasty or even liquid then enters into the core layer and, after cooling, is connected to the material of the core layer in an integrally bonded and/or form-fitting manner. The triangular configuration of the fingers 18a to 18c and 22a to 22c has the advantage that, in the plugged-together state of the two dowel parts, a defined end length of the dowel is achieved. When the lateral surfaces of the fingers 18a to 18c and the lateral surfaces of the fingers 22a to 22c contact one another, the dowel parts cannot be displaced further towards one another. Here, the material of the dowel parts can be designed in such a way that, even after introduction of ultrasonic energy, the lateral surfaces, which bear against one another, of the fingers 18a to 18c and 22a to 22c define an end position of the two dowel parts with respect to one another. Such a defined end position causes a defined length of the dowel in the state in which the dowel parts are plugged into one another and such a defined length or end length can be advantageous in the case of lightweight building boards having comparatively thin and sensitive cover layers, since then there need not to be any fear that the second or lower cover layer is pressed through from the inner side or obtains visible markings when fixing the dowel.

Figures 32, 33, 34, 35:
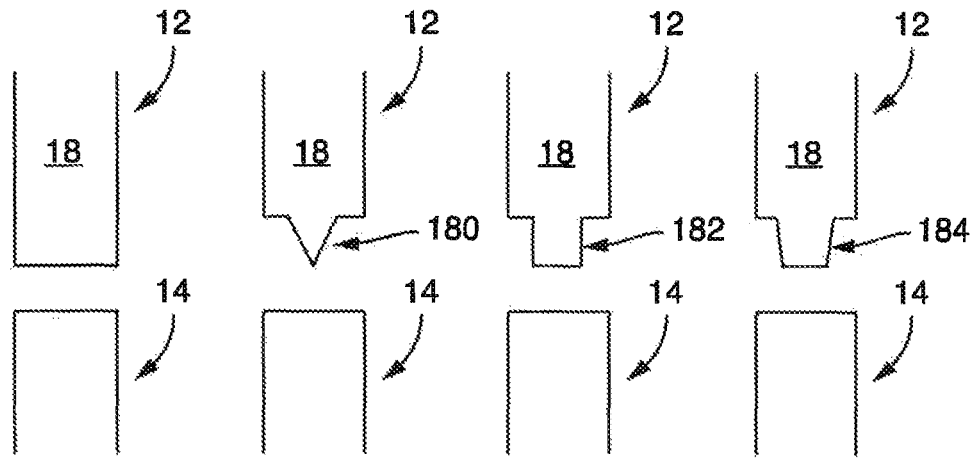
FIGS. 32 to 38 show different configurations of end surfaces of the fingers of a first dowel part and of the opposite stop surfaces of a second dowel part.

The illustration of FIG. 32 schematically shows a finger 18 of an otherwise not illustrated first dowel part 12 and an opposite stop surface of a second dowel part 14. Here, the illustration of FIG. 32 and, moreover, also the illustrations of the following FIGS. 33 to 50 are purely schematic and serve merely to illustrate possible configurations of the end surfaces of the fingers and opposite stop surfaces. In the embodiment of FIG. 32, the end surface of the finger 18 is formed perpendicular to its longitudinal direction. The opposite stop surface of the second dowel part 14 is likewise formed perpendicular to the longitudinal direction of the finger 18 and formed for example as a portion of a ring surface of the second dowel part 14. When pushing together the first dowel part 12 and the second dowel part 14, the end surface strikes the opposite stop surface, and the end surface then lies flat on the stop surface. Upon introduction of ultrasonic energy, this ultrasonic energy is then distributed over the entire end surface or stop surface.

FIG. 33 shows a further embodiment of the end surface of a finger 18 of a first dowel part 12. The opposite stop surface of the second dowel part 14 is unchanged and thus formed perpendicular to the longitudinal direction of the finger 18. The finger 18 has, at its free end, a projection 180 which tapers to a point. Here, the projection 180 can be formed as a conical tip or as a linear projection which extends in the circumferential direction. At the foot of the tip 180, said projection merges into lateral portions of the end surface of the finger 18. The tip 180 thus does not extend over the entire width of the finger 18. The tip 180 acts as an energy flow director upon introduction of ultrasonic energy. When placing the tip 180 on the opposite stop surface, the complete ultrasonic energy introduced into the finger 18 is applied to the tip 180, which is consequently heated substantially more quickly than the end surface of the finger 18 according to the embodiment of FIG. 32. When pushing together the two dowel parts 12, 14 with the simultaneous introduction of ultrasonic energy, the tip 180 will thus melt and allow a movement of the two dowel parts 12, 14 towards one another. This movement is stopped when the complete tip 180 has melted and the finger 18 lies by way of the end surface portions arranged laterally of the tip 180 on the opposite stop surface.

FIG. 34 shows a further embodiment in which the finger 18 of the first dowel part 12 is provided with a projection 182 which has a rectangular cross section. The projection 182 can be formed again as a parallelepipedal projection or as a linear projection which extends at least to a certain extent in the circumferential direction. The opposite stop surface of the second dowel part 14 is of unchanged planar design. The projection 182 also acts as an energy flow director. Since the cross-sectional surface of the projection 182 does not change upon melting of the latter, the projection 182 will, by comparison with the tip 180 of FIG. 33, be initially heated somewhat later and liquefy, but, when pushing together the two dowel parts 12, 14, the resistance does not then change until the portions of the end surface of the finger 18 that are arranged laterally of the projection 182 then lie on the opposite stop surface.

FIG. 35 shows a further embodiment in which the finger 18 of the first dowel part 12 has, at its free end, a cross-sectionally trapezoidal projection 184. The trapezoidal projection 184 does not occupy the complete end surface of the finger 18, with the result that still planar end surface portions are arranged laterally of the projection 184.

When the projection 184 strikes the opposite stop surface, which can be, for example, part of a ring surface, and upon simultaneous introduction of ultrasonic energy, the projection 184 acts as an energy flow director. The material of the projection 184 will thus melt and the pushing-together of the two dowel parts 12, 14 is made possible until the end surface portions arranged laterally of the projection 184 lie on the opposite stop surface.

Figures 36, 37, 38:
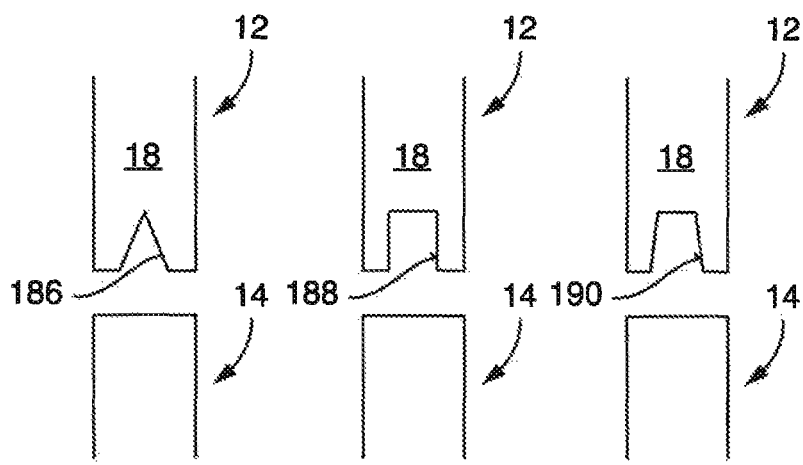
Figure 39:
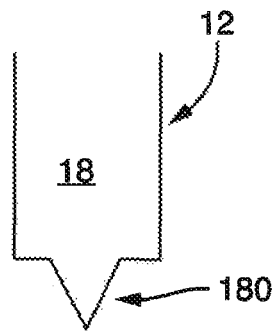
FIGS. 39 to 44 show different configurations of the end surfaces of the fingers or stop surfaces according to the invention.

FIG. 36 shows a further embodiment in which the end surface of the finger 18 is provided with a notch 186. Here, the notch 186 can take the form of a groove or else of a conical depression. The opposite stop surface of the second dowel part 14 is designed to be unchangedly planar and perpendicular to the longitudinal direction of the finger 18. The provision of the notch 186 results in there being, laterally of the notch 186, two projections which act as energy flow directors.

FIG. 37 shows a further embodiment in which the end surface of the finger 18 is provided with a cross-sectionally rectangular, in particular square, notch which can be formed again locally or as a groove which extends in the circumferential direction. To the left and right of the notch 188 there are thus formed two projections each having a rectangular cross section which act as energy flow directors.

FIG. 38 shows a further embodiment in which the end surface of the finger 18 is provided with a cross-sectional trapezoidal notch 190. To the left and right of the notch 190 there are formed two cross-sectionally trapezoidal projections which act as energy flow directors.

FIG. 39 again shows the embodiment of the finger 18 of FIG. 33 with a tip 180.

Figure 40:
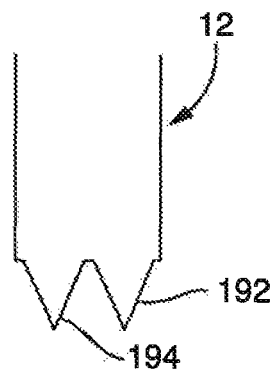

FIG. 40 shows two tips 192 and 194 on the end surface of the finger 18. Like the tip 180, the tips 192, 194 can take the form of conical tips or of linear projections which extend to a certain extent in the circumferential direction. Still planar portions of the end surface of the finger 18 are provided to the left and right and between the two tips 192, 194. The tips 192, 194 act as energy flow directors upon introduction of ultrasound. The planar end surface portions between the tips 192, 194 have a stop effect, with the result that the pushing-together of the two dowel parts is limited upon introduction of ultrasonic energy.

Figure 41:
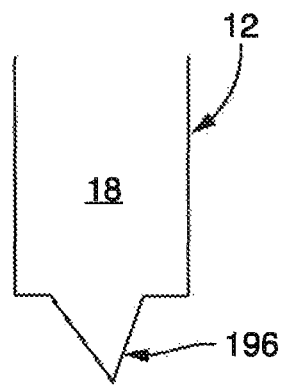

FIG. 41 shows a further embodiment in which a tip 196 of the end surface of the finger 18 is of asymmetrical design in cross section.

Figure 42:
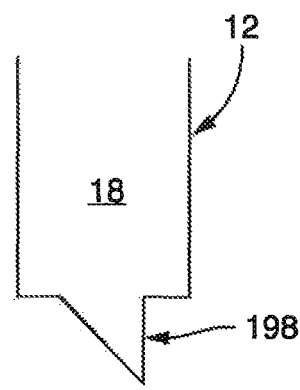

FIG. 42 shows an embodiment in which a tip 198 of the end surface of the finger 18 is again of asymmetrical design. A lateral surface of the tip 198 here extends parallel to the longitudinal direction of the finger 18. The tips 196, 198 can also be configured as local tips or, as already described, as linear projections.

Figure 43:
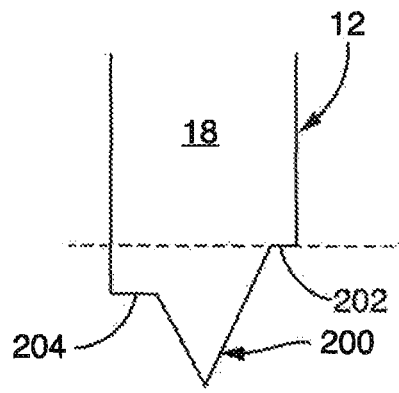

FIG. 43 shows an embodiment in which a tip 200 or a linear projection of the finger 18 has lateral surfaces of different lengths as seen in cross section. This means that the planar end surface portions 202 and 204 are spaced apart from one another as seen in the longitudinal direction of the finger 18.

Figure 44:
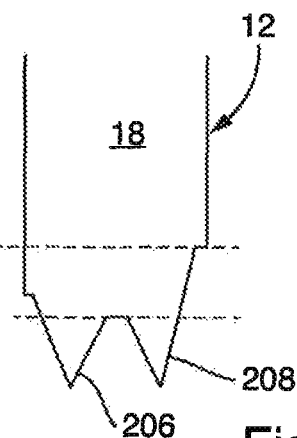

FIG. 44 shows an embodiment in which the end surface of the finger 18 has two tips 206, 208 or linear projections. The lateral surface, which is situated on the left in FIG. 44, of the tip 206 is shorter than the lateral surface, which is situated on the right in FIG. 44, of the tip 208. As a result, the planar end surface portions of the finger 18 lie at different levels. The planar end surface portion situated between the two tips 206, 208 is also arranged at a different level than the two lateral end surface portions.

Figure 45:
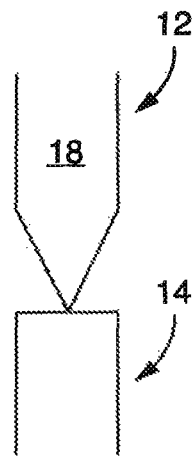
FIGS. 45 to 48 show different configurations of the end surfaces of the fingers and of the opposite stop surfaces of the respective other dowel part.

FIG. 45 shows a further embodiment in which the complete end surface of the finger 18 is designed to be conical or as a linear projection with a triangular cross section. It can be seen that, when placing the finger 18 on the opposite, planar stop surface of the second dowel part 14, there first occurs a point contact or linear contact.

Figure 46:
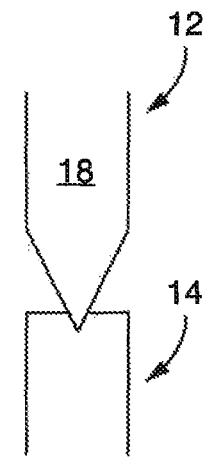

FIG. 46 shows an embodiment in which the finger 18 again has a conical tip or a linear projection which forms its complete end surface, but in which the opposite stop surface is provided with a cross-sectionally triangular notch. Such a notch, which can take the form of a conical depression or of a cross-sectionally triangular groove, makes it possible, on the one hand, for a concentration of the introduced ultrasonic energy to occur but, on the other hand, a geometrically correct positioning of the finger 18 on the stop surface of the second dowel part 14 can also be ensured.

Figure 47:
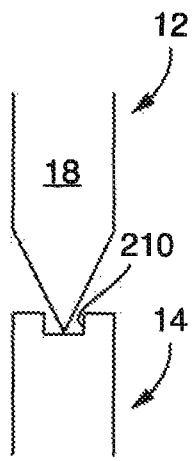

FIG. 47 shows an embodiment in which the stop surface of the second dowel part 14 is provided with a notch 210 which is cross-sectionally rectangular. The notch 210 can take the form of a parallelepipedal depression or of a cross-sectionally rectangular groove. As can be seen in FIG. 47, the position of the finger 18 in the lateral direction is not exactly defined in the notch 210. In this way, tolerances between the finger 18 and the second dowel part 14 can be compensated for and it can nevertheless be ensured that the finger 18 is arranged in the notch 210 when the two dowel parts 12, 14 are pushed together.

Figure 48:
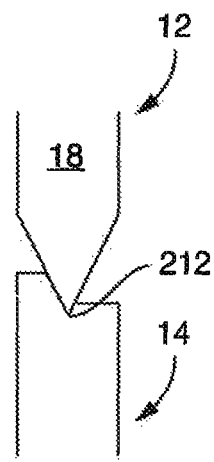

FIG. 48 shows an embodiment in which the stop surface of the second dowel part 14 is stepped on the one hand and on the other hand has a cross-sectionally triangular notch 212.

Within the scope of the invention, the embodiments described in FIGS. 32 to 48 of the configuration of the end surfaces of the fingers 18 of the first dowel part 12 and of the stop surfaces of the second dowel part 14 can of course also be applied to the configuration of the end surfaces 22 of the fingers of the second dowel part 14 and of the associated stop surfaces of the first dowel part 12. Moreover, the configurations described in FIGS. 32 to 48 of the end surfaces of the fingers and of the associated stop surfaces can be combined in any desired manner. For example, the formation of the end surface of the finger 18 of FIG. 33 can be combined with the configuration of the stop surface of the second dowel part 14 of FIG. 47. All further possible combinations of FIGS. 32 to 48 are possible and provided within the scope of the invention.

Figure 49:
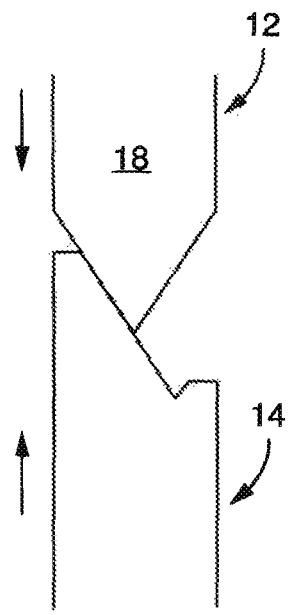
FIG. 49 shows a further possibility of the configuration of the end surfaces of the fingers and of the opposite stop surfaces of the respective other dowel part in a first state.

FIG. 49 shows a further embodiment in which the finger 18 of the first dowel part 12 is provided with a tip which occupies the complete end surface of the finger 18. The tip of the finger 18 can take the form of a conical tip or of a linear projection. The tip of the finger 18 can, for example, also assume the shape as is described in FIGS. 41, 42, 43.

The opposite stop surface of the second dowel part 14 is obliquely formed. FIG. 49 shows a first state during the pushing-together of the first dowel part 12 and of the second dowel part 14, in which the first dowel part 12 and the second dowel part 14 just contact one another. In this state, the tip of the finger 18 bears against the oblique stop surface of the second dowel part 14.

Figure 50:
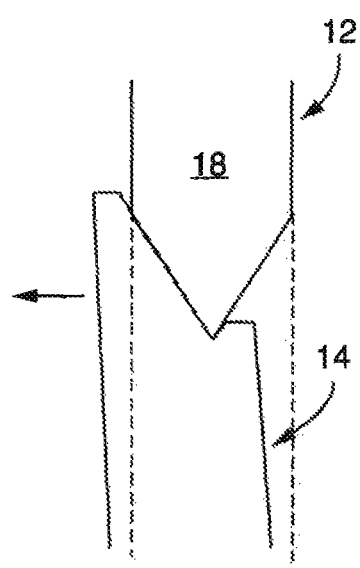
FIG. 50 shows the finger and the stop surface of FIG. 49 in a second, pushed-together state.

FIG. 50 shows the completely pushed-together state of the first dowel part 12 and of the second dowel part 14. The mutually striking oblique surfaces of the tip of the finger 18 and of the stop surface of the second dowel part 14 cause the stop surface of the second dowel part 14 to be laterally displaced, to the left in FIG. 15. Such a lateral displacement is expediently provided such that it occurs in the radial direction with respect to the first dowel part 12 and with respect to the second dowel part 14. This radial spreading of the second dowel part 14 is stopped in the state of FIG. 50 by virtue of the fact that the tip of the finger 18 comes to lie in a notch in the stop surface of the second dowel part 14. The radial spreading can result in an additional, mechanical anchoring of the second dowel part 14 in the lightweight building board.

The embodiment explained by way of FIGS. 49 and 50 can of course also be applied to the configuration of the end surfaces of the fingers 22 of the second dowel part 14 and of the associated stop surfaces on the first dowel part 12.

The invention claimed is:

1. Dowel for arranging in lightweight building boards, wherein a lightweight building board has a first cover layer and a second cover layer made of compact pressure-resistant material and, arranged between the cover layers, a core layer made of material having a lower density than the cover layers, in particular paper honeycombs, foam or solid wood of low density, comprising a first dowel part and a second dowel part, wherein the first and the second dowel part are designed to be displaceable relative to one another, wherein the first dowel part and the second dowel part each have at least two fingers which extend parallel to a longitudinal direction of the dowel, wherein, in the plugged-together state of the first and of the second dowel part, the fingers of the first dowel part and the fingers of the second dowel part inter-engage at least in certain portions.

2. Dowel according to claim 1 wherein in the mounted state of the dowel, the fingers of the two dowel parts form a cylindrical, in particular circular-cylindrical, body at least in certain portions.

3. Dowel according to claim 1 wherein in the mounted state of the dowel, the fingers of the two dowel parts form wall portions of a cross-sectionally ring-shaped, in particular circular-ring-shaped, body.

4. Dowel according to claim 1 wherein as seen in cross section, the fingers form polygonal segments, in particular of a ring-shaped body.

5. Dowel according to claim 4 wherein as seen in cross section, the fingers each form circular-ring segments.

6. Dowel according to claim 2 wherein the body forms an outer wall with a generally triangular, rectangular, elliptical, oval, circular or in the form of the figure eight cross-sectional shape.

7. Dowel according to claim 1 wherein the fingers at least partially have, at their free end, an end surface which is arranged obliquely to the longitudinal direction of the dowel.

8. Dowel according to claim 7 wherein the end surface runs obliquely towards the centre longitudinal axis of the dowel and/or extends in an ascending manner in a side view of the dowel.

9. Dowel according to claim 7 wherein in the state in which the first dowel part and the second dowel part are completely pushed into one another, the end surfaces of the fingers bear against the respective other dowel part at least in certain portions.

10. Dowel according to claim 1 wherein the fingers are designed to taper in the longitudinal direction of the dowel, wherein the fingers of the first dowel part are designed to taper downwardly and the fingers of the second dowel part are designed to taper upwardly.

11. Dowel according to claim 1 wherein characterized in that the fingers at least partially have one or more steps in at least one lateral surface which is situated opposite an adjacent finger.

12. Dowel according to claim 11 wherein in the mounted state of the dowel, mutually opposite lateral surfaces of adjacent fingers bear against one another.

13. Dowel according to claim 1 wherein characterized in that the fingers have one or more steps in the lateral surfaces in a section plane perpendicular to the longitudinal axis.

14. Dowel according to claim 1 wherein the two dowel parts and the fingers are designed in such a way that, in the mounted state of the dowel, the fingers are pressed radially outwardly at their free ends.

15. Dowel according to claim 1 wherein in the mounted state of the dowel, the two dowel parts form a screw channel.

16. Dowel according to claim 15 wherein at least one of the dowel parts has radially inwardly protruding projections for forming the screw channel.

17. Dowel according to claim 16 wherein the projections are arranged on the inner side of the fingers.

18. Dowel according to claim 1 wherein each dowel part has an, in particular ring-shaped, basic body to which the fingers of a respective dowel part are connected.

19. Dowel according to claim 18 wherein the fingers extend from the basic body as far as their free end.

20. Dowel according to claim 1 wherein the first dowel part and the second dowel part are identically designed.

21. Dowel according to claim 1 wherein the dowel consists of a thermoplastic material at least in certain portions.

22. Dowel according to claim 21 wherein at least the free ends of the fingers, in particular at least the complete fingers, consist of thermoplastic material.

23. Method for fixing at least one dowel according to claim 1 in a lightweight building board, comprising the following steps: introducing a hole into the lightweight building board, in particular a blind hole, inserting the first and the second dowel part into the hole, with the result that the fingers of the two dowel parts inter-engage at least in certain portions, applying ultrasonic energy to the dowel, with the result that, at least in the regions in which the dowel bears against the inner wall of the hole in the region of the first cover layer, the second cover layer and/or in the region of the core layer, the thermoplastic material of the dowel is heated and is brought into a pasty or free-flowing state, penetrates into at least one of the cover layers and/or the core layer and, after switching off the ultrasonic energy, cools, with the result that the dowel is fixed in the lightweight building board in an integrally bonded and/or form-fitting manner.

24. Method according to claim 23 wherein upon applying ultrasonic energy to the dowel, portions of the fingers that bear against one another are heated and brought into a pasty or liquid state, with the result that, after switching off the ultrasonic energy and cooling, the portions are connected to one another in an integrally bonded manner.

25. Arrangement comprising a dowel according to claim 1 and a lightweight building board, wherein the fingers of the two dowel parts inter-engage at least in certain portions, and wherein the first dowel part is fixed at least to the first cover layer, the second dowel part is fixed at least to the second cover layer and/or the first dowel part and the second dowel part are fixed to the core layer.

26. Arrangement according to claim 25 wherein the fingers of the first and/or the second dowel part are fixed to the core layer of the lightweight building board at least in certain portions.

* * * * *